(12) United States Patent
Grabowski et al.

(10) Patent No.: US 11,365,084 B2
(45) Date of Patent: Jun. 21, 2022

(54) DEVICES FOR LIFTING, MANEUVERING, WINDING AND UNWINDING REELS

(71) Applicant: SONOCO DEVELOPMENT, INC., Hartsville, SC (US)

(72) Inventors: Russell Paul Grabowski, Pittsburgh, PA (US); Xiaokai Niu, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 154 days.

(21) Appl. No.: 16/931,869

(22) Filed: Jul. 17, 2020

(65) Prior Publication Data

US 2020/0354183 A1 Nov. 12, 2020

Related U.S. Application Data

(62) Division of application No. 16/294,300, filed on Mar. 6, 2019, now Pat. No. 10,759,627, which is a division of application No. 15/384,449, filed on Dec. 20, 2016, now Pat. No. 10,273,111.

(51) Int. Cl.
*B65H 49/36* (2006.01)
*B60P 3/035* (2006.01)
*B65H 49/32* (2006.01)
*B65H 49/38* (2006.01)

(52) U.S. Cl.
CPC .............. *B65H 49/36* (2013.01); *B60P 3/035* (2013.01); *B65H 49/321* (2013.01); *B65H 49/325* (2013.01); *B65H 49/38* (2013.01)

(58) Field of Classification Search
CPC ...... B65H 49/36; B65H 49/38; B65H 49/321; B65H 49/325; B60P 3/035
See application file for complete search history.

(56) References Cited

U.S. PATENT DOCUMENTS

| 2,775,357 A | 12/1956 | De Arment |
| 3,944,094 A | 3/1976 | Compton |
| 3,995,758 A | 12/1976 | Kovaleski |

(Continued)

FOREIGN PATENT DOCUMENTS

| EP | 0340770 A1 | 11/1989 |
| EP | 0530686 A1 | 3/1993 |
| EP | 0568750 A1 | 11/1993 |

*Primary Examiner* — Sang K Kim
(74) *Attorney, Agent, or Firm* — Nelson Mullins Riley & Scarborough LLP

(57) ABSTRACT

An apparatus for lifting, maneuvering, winding or unwinding reels comprising a pair of devices having an elongated retractable frame having a first end and a second end which are adjustable relative to one another; a first crossbar having two opposite ends, the first crossbar being mounted to a first end of the elongated retractable frame; a second crossbar having two opposite ends, the second crossbar being mounted to a second end of the elongated retractable frame; a first roller carrier mounted on the first crossbar; a second roller carrier mounted on the second crossbar, parallel to the first roller carrier, wherein the roller rotates axially about the roller carrier; and a means for adjusting the first and second end of the elongated retractable frame relative to one another so that the first and second ends of the elongated retractable frame are moved closer together and further apart.

9 Claims, 15 Drawing Sheets

(56) References Cited

U.S. PATENT DOCUMENTS

| | | | |
|---|---|---|---|
| 3,998,403 A * | 12/1976 | Kovaleski | B65H 49/32 |
| | | | 242/129.72 |
| 4,030,704 A | 6/1977 | Beierle et al. | |
| 4,296,891 A | 10/1981 | Sidaway et al. | |
| 4,447,012 A | 5/1984 | Woodruff | |
| 4,705,283 A | 11/1987 | Kleisath | |
| 4,711,407 A | 12/1987 | Boon | |
| 4,752,047 A * | 6/1988 | Franks, Jr. | B65H 49/26 |
| | | | 242/129.6 |
| 5,052,877 A | 10/1991 | Jääskeläinen et al. | |
| 5,088,654 A | 2/1992 | Cielker | |
| 5,320,295 A | 6/1994 | Jääskeläinen et al. | |
| 5,421,691 A | 6/1995 | Ferrone | |
| 5,806,787 A * | 9/1998 | Schneider | B65H 49/321 |
| | | | 242/598.5 |
| 6,299,100 B1 * | 10/2001 | Cloud | B65H 49/32 |
| | | | 242/391.1 |
| 6,390,759 B1 | 5/2002 | Novak et al. | |
| 7,000,900 B1 | 2/2006 | McKenney et al. | |
| 8,025,261 B2 | 9/2011 | Jordan et al. | |
| 8,276,858 B1 | 10/2012 | Jordan et al. | |
| 8,931,724 B2 | 1/2015 | Jordan et al. | |
| 9,004,392 B1 | 4/2015 | Bigbee, Jr. et al. | |
| 9,187,289 B1 | 11/2015 | Jordan et al. | |
| 9,975,727 B1 * | 5/2018 | Jordan | B65H 49/34 |
| 10,273,111 B2 * | 4/2019 | Grabowski | B60P 3/035 |
| 10,759,627 B2 * | 9/2020 | Grabowski | B65H 49/36 |
| 10,822,194 B1 * | 11/2020 | Hegler | B65H 75/242 |
| 2002/0074447 A1 * | 6/2002 | Schneider | B65H 57/26 |
| | | | 242/588 |
| 2009/0045282 A1 | 2/2009 | Cecil | |
| 2015/0259173 A1 * | 9/2015 | Guiffault | B65H 49/325 |
| | | | 242/401 |
| 2015/0291385 A1 | 10/2015 | Watkins | |

\* cited by examiner

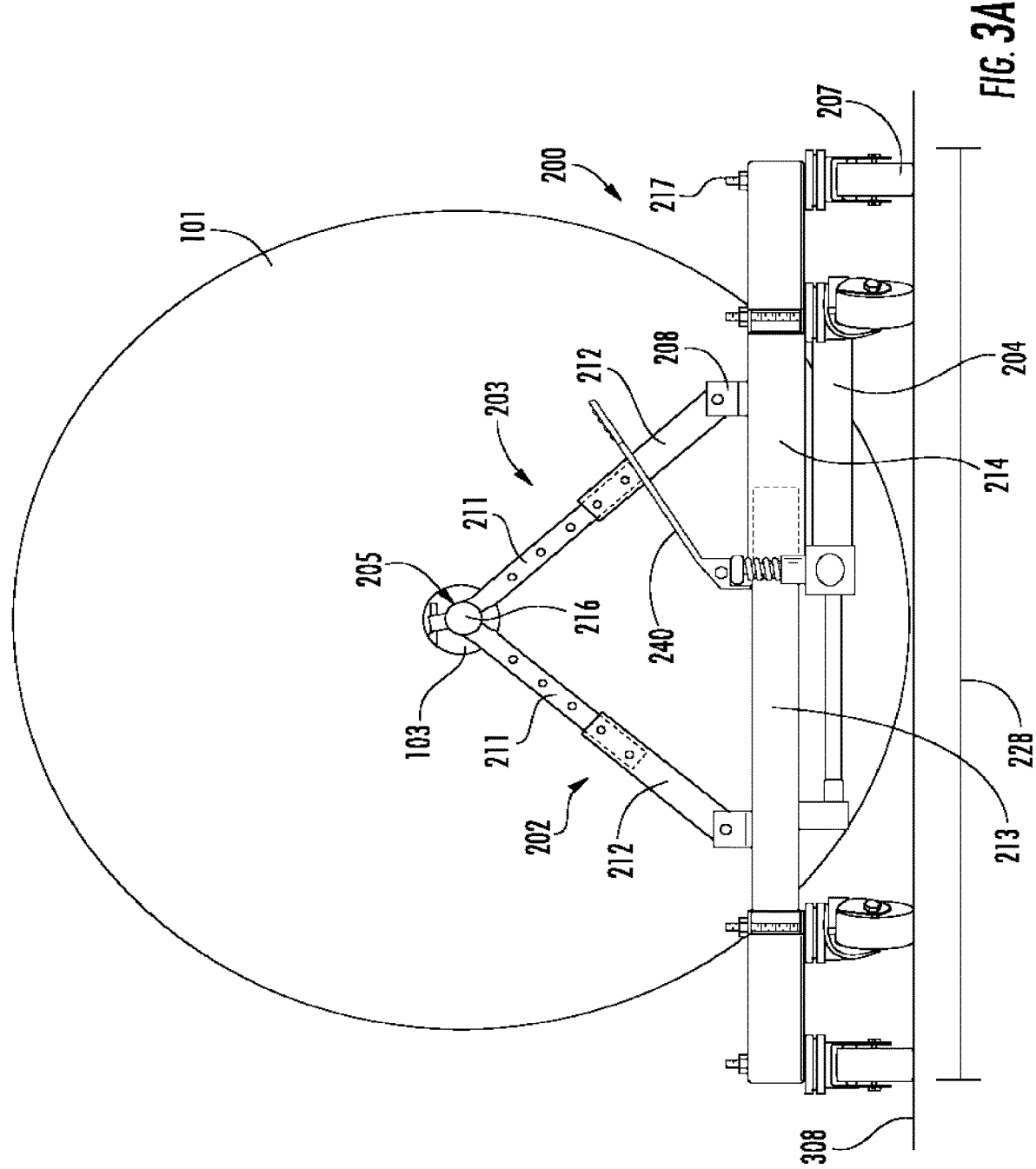

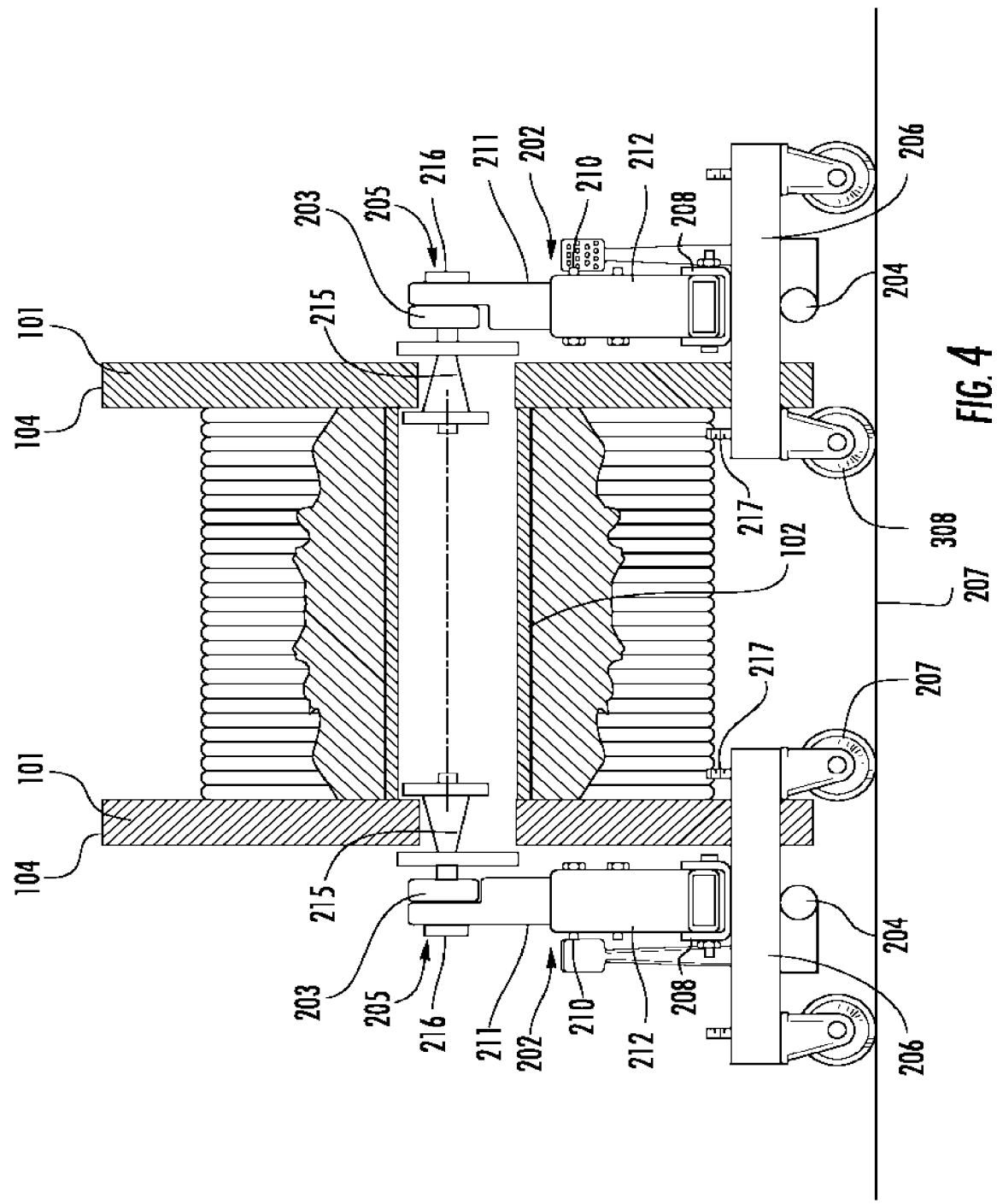

DEVICES FOR LIFTING, MANEUVERING, WINDING AND UNWINDING REELS

CROSS-REFERENCE TO RELATED APPLICATIONS

This application is a divisional application of U.S. patent application Ser. No. 16/294,300, filed Mar. 6, 2019, entitled "Device for Lifting, Maneuvering, Winding and Unwinding Reels", which is a divisional application of U.S. patent application Ser. No. 15/384,449, filed Dec. 20, 2016, issued as U.S. Pat. No. 10,273,111, entitled "Device for Lifting, Maneuvering, Winding and Unwinding Reels", which is incorporated herein in its entirety.

FIELD OF THE INVENTION

The present invention relates generally to devices that can be used to lift, maneuver, move, wind, and unwind reels or spools of wound materials, such as wire or cable.

SUMMARY OF THE INVENTION

According to an aspect, the present invention provides an apparatus for lifting, maneuvering, winding, and unwinding reels, wherein the reel comprises a centrally-disposed barrel having two opposite ends and a center bore therethrough, the apparatus comprising a pair of devices, wherein each device comprises: a center retractable member having a first end and a second end which are adjustable relative to one another; a first angularly-oriented vertical support bar having a proximal end and a distal end, wherein the first angularly-oriented vertical support bar is pivotally mounted, at its proximal end, on a first end of the center retractable member; a second angularly-oriented vertical support bar having a proximal end and a distal end, wherein the angularly-oriented vertical support bar is pivotally mounted, at its proximal end, on a second end of the center retractable member and wherein the first angularly-oriented vertical support bar and the second angularly-oriented vertical support bar are pivotally joined to each other at their distal ends; a reel support member mounted on the joint of the first angularly-oriented vertical support bar and the second angularly-oriented vertical support bar, wherein the bore of the reel is adapted to removably receive the reel support member; and a means for adjusting the first and second end of the center retractable member relative to one another so that the first and second ends of the center retractable member are moved closer together and further apart, thereby moving the reel support member upward and downward, respectively.

According to another aspect, the present invention also provides an apparatus for lifting and maneuvering reels, wherein the reel comprises a centrally-disposed barrel having two opposite ends, a proximal and distal flange attached to each of the opposite ends, and a center bore therethrough and wherein the apparatus comprises: a center retractable member having a first end and a second end which are adjustable relative to one another; a first angularly-oriented vertical support bar having a proximal end and a distal end, wherein the first angularly-oriented vertical support bar is pivotally mounted, at its proximal end, on a first end of the center retractable member; a second angularly-oriented vertical support bar having a proximal end and a distal end, wherein the angularly-oriented vertical support bar is pivotally mounted, at its proximal end, on a second end of the center retractable member and wherein the first angularly-oriented vertical support bar and the second angularly-oriented vertical support bar are pivotally joined to each other at their distal ends; a reel support member mounted on the joint of the first angularly-oriented vertical support bar and the second angularly-oriented vertical support bar, wherein the bore of the reel is adapted to removably receive the reel support member; and a means for adjusting the first and second end of the center retractable member relative to one another so that the first and second ends of the center retractable member are moved closer together and further apart, thereby moving the reel support member upward and downward, respectively.

According to another aspect, the present invention also provides an apparatus for lifting and maneuvering reels, wherein the reel comprises a centrally-disposed barrel having two opposite ends and circular flanges attached to each of the opposite ends, said apparatus comprising a pair of devices, wherein each device comprises: an elongated retractable frame having a first end and a second end which are adjustable relative to one another; a first crossbar having two opposite ends, the first crossbar being mounted to a first end of the elongated retractable frame; a second crossbar having two opposite ends, the second crossbar being mounted to a second end of the elongated retractable frame; a first roller carrier mounted on the first crossbar, wherein the first roller carrier comprises a roller which is adapted to engage a rim of the first circular flange of the reel, wherein the roller rotates axially about the roller carrier; a second roller carrier mounted on the second crossbar, parallel to the first roller carrier, wherein the second roller carrier comprises a roller which is adapted to engage a rim of the second circular flange of the reel, wherein the roller rotates axially about the roller carrier; and a means for adjusting the first and second end of the elongated retractable frame relative to one another so that the first and second ends of the elongated retractable frame are moved closer together and further apart, thereby moving the first and second roller carriers closer together and apart, respectively.

According to yet another aspect, the present invention also provides an apparatus for lifting and maneuvering reels, wherein the reel comprises a centrally-disposed barrel having two opposite ends and a center bore therethrough, said apparatus comprising a pair of devices, wherein each device comprises: a center retractable member having a first end and a second end which are adjustable relative to one another; a first angularly-oriented vertical support bar having a proximal end and a distal end, wherein the first angularly-oriented vertical support bar is pivotally mounted, at its proximal end, on a first end of the center retractable member; a second angularly-oriented vertical support bar having a proximal end and a distal end, wherein the angularly-oriented vertical support bar is pivotally mounted, at its proximal end, on a second end of the center retractable member and wherein the first angularly-oriented vertical support bar and the second angularly-oriented vertical support bar are pivotally joined to each other at their distal ends; a means for adjusting the first and second ends of the center retractable member relative to one another so that the first and second ends of the center retractable member are moved closer together and further apart; and a reel bore bar adapted to be inserted through the center bore of the reel and removably affixed to the pivotal joint of the first angularly-oriented vertical support bar and the second angularly-oriented vertical support bar on each device, wherein adjustment of the first and second ends of the center retractable member toward each other moves the removably affixed reel bore bar upward.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 3A is a front view of a device in an embodiment of the present invention, engaged with a reel;

FIG. 4 is a cross sectional view of a device in an embodiment of the present invention, engaged with a reel;

Figure 1:
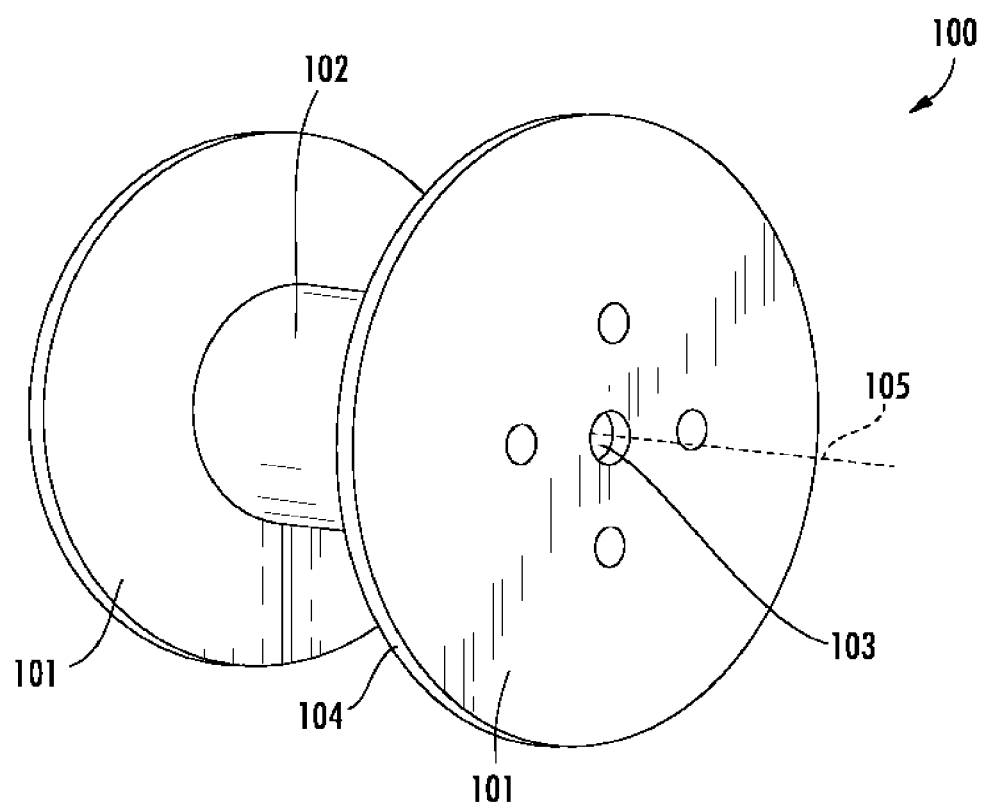
FIG. 1 is a perspective view of a reel in an embodiment of the present invention.

Repeated use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is directed to devices that can be used to lift, maneuver, move, wind, and unwind large reels or spools (referred to herein as "reels") of wound material, such as electrical wire, steel cable, rope, flexible sheet material, or any other material known in the art that can be wound or coiled. In an embodiment, the devices of the present invention can be used in connection with wooden, plastic, or other heavy, large, or bulky reels. The devices of the invention may be used with reels or spools that contain wound material or that can be loaded with wound material.

The devices of the present invention may avoid the need for cranes or forklifts to lift and move heavy reels and spools under certain conditions. The devices of the present invention are compact in size, allowing use within a building, room, hallway, or even outside, on a job site. The devices of the present invention may additionally eliminate the need to manually roll a reel on its circular flanges into a desired location and position, a practice that is strenuous and awkward, causes damage to the edges of the flanges, and makes maneuvering of the reel difficult. This method of moving reels additionally requires that the flanges be rolled together, in the same direction, resulting in primarily straight-line travel. When the reel needs to travel along curves or make turns while being moved in this manner, one flange rolls and the other must be dragged. These issues may be avoided with the present invention. In an embodiment, the devices of the present invention provide a zero turn radius for the loaded reel, such that the reel is capable of moving in any direction instantaneously (360-degree movement capability). The devices of the present invention also allow the reels to be moved with relative ease by merely pushing the loaded reel. The devices of the invention may also permit the loaded reels to be placed very close to the installation site for the wound materials.

The devices of the present invention can be utilized with reels of all sizes and dimensions. Additionally, once in position, embodiments of the present invention allow the reel itself to turn freely while loaded onto the device, allowing the wire, cable, or other wound material to be unwound from the reel relatively easily (or material to be wound onto the reel relatively easily).

The devices of the present invention are reusable, relatively lightweight, and are independently mobile. As an example, a large wooden reel can be wound with wire at wire manufacturing or supply facility. The reel can then be loaded onto an apparatus of the present invention and easily maneuvered to its desired location within the manufacturing/supply facility for storage. The apparatus of the present invention could then be removed from the reel, if desired, or can be locked in place and left as is in storage. For transportation to a worksite, for example, the apparatus of the present invention can also be used to move a reel from its storage location to a vehicle for transport, can be used to move the reel from the vehicle to the worksite, and can be used on the worksite to move the reel from location to location.

Using the present invention, the reel may be easily wound and/or unwound while still engaged with the inventive device, without the need to mount the reel in a separate holding device. As such, the present invention serves the dual purposes of transporting and winding/unwinding reels. When the wire or other material has been emptied from the reel, the devices of the present invention can be used to transport the empty reel to be disposed of or reloaded with materials. The apparatus of the present invention could alternatively be removed from the empty reel and reused with another reel.

Similarly, an apparatus of the present invention could be present at a worksite and, upon delivery of multiple reels of wire, could be used to move each of the multiple reels to their desired location for usage. In this embodiment, the devices of the present invention may be loaded with a reel, pushed to a desired location, removed from the reel, and immediately reused in connection with another reel. As such, the devices of the present invention do not need to be set up and/or adjusted at the material winding facility and can be set up, dismantled, and/or adjusted at any location. Additionally, because the devices of the present invention are adjustable, they can accommodate reels of varying size and weight.

Turning to the drawings, FIG. 1 illustrates an exemplary reel 100 which the inventive devices can be used to move, with or without wire, cable, or other materials wound upon it. In an embodiment, the reel 100 has circular flanges 101 attached to opposite ends of an elongated, centrally-disposed barrel 102 upon which wire or cabling can be wound. The elongated barrel 102 contains a center bore 103 which extends through the center of the elongated barrel 102 and the center of each flange 101. The center bore 103 defines an elongated axis 105 about which the reel 100 can be rotated when supported in an elevated position, relative to the floor, by the inventive device. Each of the circular flanges 101 defines a cylindrical rim 104 around its peripheral edge. The rim 104 of each flange 101 rests on the ground or floor surface 308 (shown in FIG. 3A). The elongated barrel 102 and the center bore 103 are oriented substantially parallel to the floor surface 308.

Figure 9A:
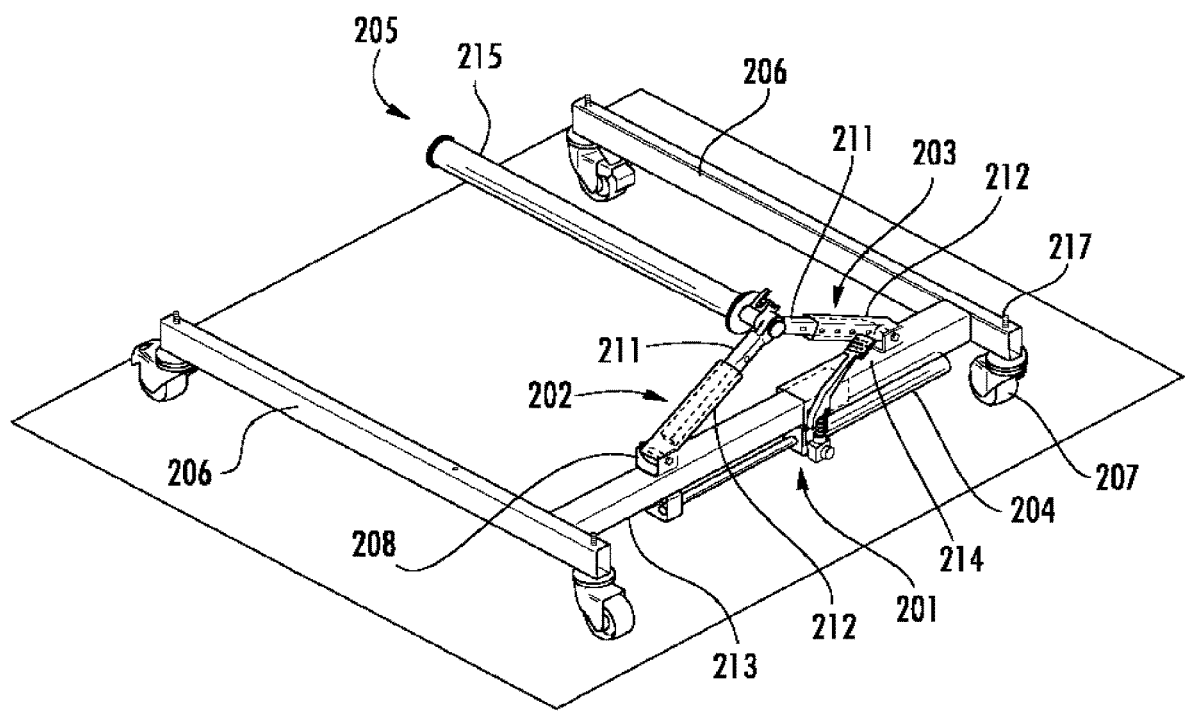
FIG. 9A is a perspective view of a device in an embodiment of the present invention.

FIGS. 2-4 illustrate an embodiment of the present invention. In should be understood that device 200 can be used in pairs, on either side of a reel, or could be used singly, on one side of a reel (shown in FIG. 9). In this embodiment, the inventive device 200, generally speaking, comprises an A-frame support structure for the reel 100. In an embodiment, the device 200 comprises a horizontal center retractable member 201, a first angularly-oriented vertical support bar 202, and a second angularly-oriented vertical support bar 203. In an embodiment, the center retractable member 201 has a first end and a second end which are adjustable relative to one another. In a particular embodiment, the center retractable member 201 may comprise a male/female telescoping configuration. In this embodiment, at least a portion of the male member 213 is accepted by the female member 214 through an open end thereof. The male member 213 and the female member 214 are sized to permit the members to telescopically move relative to one another and thereby permit the spaced distance 228 between the opposite ends of the horizontal center retractable member 201 to be altered. Though a particular embodiment described herein utilizes a male and female telescoping configuration, it should be understood that the center retractable member 201 may comprise a rod and channel configuration, a track and rail configuration, or any other configuration known in the art to allow the first end and second end of the center retractable member 201 to be adjusted relative to one another.

The first angularly-oriented vertical support bar 202 and the second angularly-oriented vertical support bar 203 may, in an embodiment, be pivotally joined to each other at their distal ends and may each be pivotally mounted on the center retractable member 201 at their proximal ends, creating the A-frame support. In an embodiment, a pair of plates 208 which extend upwardly is disposed along the center retractable member 201. In an embodiment, the plates 208 are welded to the center retractable member 201. In an embodiment, the plates 208 define at least one set of aligned through-openings. The proximal ends of the first angularly-oriented vertical support bar 202 and the second angularly-oriented vertical support bar 203 may define similar aligned through-openings. The first angularly-oriented vertical support bar 202 and the second angularly-oriented vertical support bar 203 can be pivotally connected to the center retractable member 201 by aligning the through-openings of the plates 208 with the through-openings of the first angularly-oriented vertical support bar 202, on one hand, and the through-openings of the second angularly-oriented vertical support bar 203, on the other hand. A bolt, pin, or any other mechanism known in the art may be inserted through the aligned through-openings to create a pivoting point. The shank of the bolt, pin, or other mechanism should extend through both of the aligned through-openings in each set. In an embodiment, the bolt, pin, or other mechanism is then secured in place with a nut, pin, or other mechanism known in the art so as to securing the pivoting point.

In an embodiment, the first angularly-oriented vertical support bar 202 and the second angularly-oriented vertical support bar 203 are each male/female telescoping members. In this embodiment, each of the support bars 202 and 203 may define at least one set of aligned through-openings 209 in its male member 211 and its female member 212. The sets of aligned through-openings 209 may be vertically disposed with respect to one another. As the male member 211 is inserted into the female member 212, the through-openings 209 of each may be aligned and a bolt, pin, or any other mechanism known in the art 210 may be inserted therethrough. In an embodiment, this process locks the device 200 in position. In an embodiment, this process may be used to customize the device 200 based upon the size of the reel 100 that it will be supporting.

Each of the center retractable member 201, the first angularly-oriented vertical support bar 202, and the second angularly-oriented vertical support bar 203 may be of any length known in the art. The angles between the center retractable member 201, the first angularly-oriented vertical support bar 202, and the second angularly-oriented vertical support bar 203 may be variable as the retractable member 201 is adjusted.

The device 200 also comprises a reel support member 205, which, in an embodiment, is mounted on the joint of the first angularly-oriented vertical support bar 202 and the second angularly-oriented vertical support bar 203. The reel support member 205 is adapted such that it may be inserted into the center bore 103 of the reel 100 in order to lift and support the reel 100 during maneuvering and movement of the device 200. As such, the outer diameter of the reel support member 205, may, in an embodiment, be smaller than the inner diameter of the center bore 103 of the reel 100. In another embodiment, however, the diameter of the reel support member 205 is adjustable such that it is inserted into the center bore 103 and is then expanded to match the inner diameter of the bore 103. In yet another embodiment, the diameter of the reel support member 205 may be adjustable such that it is inserted into the center bore 103 and is then expanded such that it is larger than the inner diameter of the bore 103.

The length of the reel support member 205 may be any length known in the art. In one embodiment, the reel support member 205 extends substantially through the bore 103 of the reel 100, such that only one device 200 would be needed to support the weight of the reel. In this embodiment, the reel support member 205 may extend through the bore 103 of the reel 100, such that it engages both the proximal and distal flanges 101 of the reel 100.

In another embodiment, the reel support member 205 does not extend fully through the bore 103 of the reel 100 and a pair of devices 200 are utilized on each side of the reel 100, to support it. In an embodiment, the reel support member 205 has enough center support to allow a reel 100 to be maneuvered and moved efficiently and to support the necessary weight of a loaded reel 100. In an embodiment, the reel support member 205 additionally allows the reel 100 to rotate freely while loaded on the device 200, allowing the elongated barrel 102 of the reel 100 to be wound with materials or unwound for use of the materials while the inventive device 200 remains stationary. To this end, the reel support member 205 may, in an embodiment, include a load-carrying spindle 216, which may be stationary, a roller 215, and a bearing assembly interposed between the spindle 216 and roller 215. In this embodiment, the reel support member 205 allows for rotation of the reel 100 on the roller 215, about its elongated axis 105.

In an embodiment, the length of the spindle 216 may vary based upon the length of the roller 215, the thickness of the male members 211, and/or the distance between the roller 215 and the male members 211. The distance between the roller 215 and the male members 211 may be of a sufficient distance to prevent any materials that are wound about the barrel 102 of the reel 100 and potentially sticking through the reel flange 101, from interfering with the rotation of the device 200. In an embodiment, the length of the roller 215 is determined based upon the thickness of the flanges 101. In an embodiment, the flange 101 thickness may be from approximately 1.5 to about 2.5 inches. In such an embodiment, the length of the roller 215 may be slightly longer than the flange 101 thickness.

In an embodiment, the diameter of the center bore 103 of the reel 100 may be approximately 3 inches. In such an embodiment, the diameter of the reel support member 206, including the roller 215, may be slightly less than approximately 3 inches.

In an embodiment, the roller 215 has a proximal lip 220 and a distal lip 219. In an embodiment, the proximal lip 220 has a greater diameter than the distal lip 219. Similarly, in an embodiment, the proximal lip 220 has a greater diameter than the inner diameter of the center bore 103. In another embodiment, the distance between the proximal lip 220 and the distal lip 219 is slightly greater than the thickness of the flange 101. In this embodiment, the flange 101 is supported on the roller 215, and the proximal lip 220 and the distal lip 219 provide a barrier on either side of the flange 101, thereby preventing the flange 101 from slipping off the reel support member 205. In another embodiment, the roller 215 is tapered such that the diameter of the roller 215 increases toward its distal lip 219. In this embodiment, the tapering causes the flange 101 to move, if at all, toward the proximal lip 220 and not the distal lip 219, thereby further preventing the flange 101 from slipping off of the reel support member 205. In an embodiment, the degree of the taper may be in the range of about 0.1° to about 5°. In a particular embodiment, the degree of the taper may be in the range of about 2° to about 4°. In an embodiment, the diameter of the proximal lip 220 may be approximately four inches and the diameter of the center bore 103 may be approximately three inches.

Figure 2A:
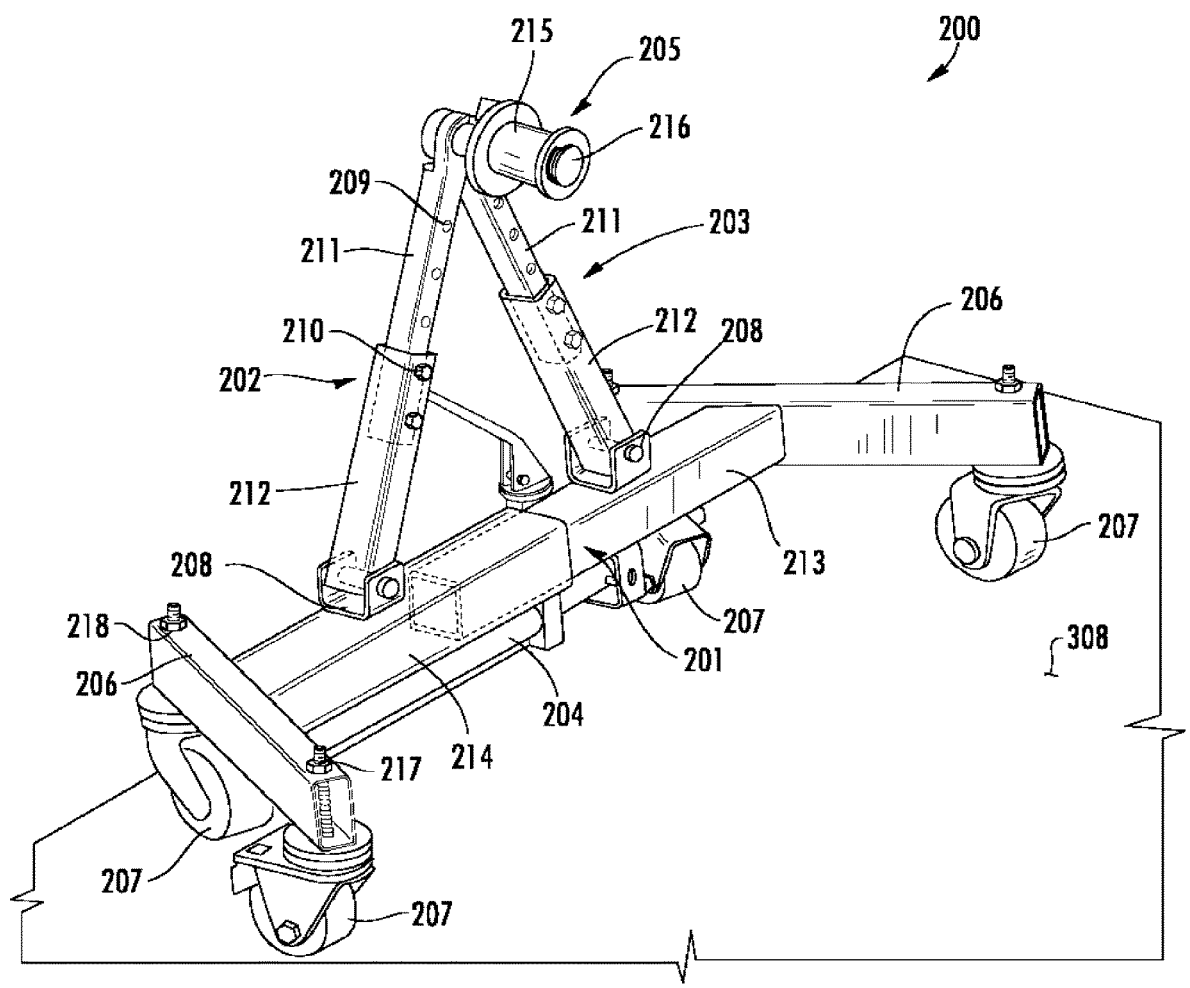
FIG. 2A is a perspective view of a device in an embodiment of the present invention.
Figure 2B:
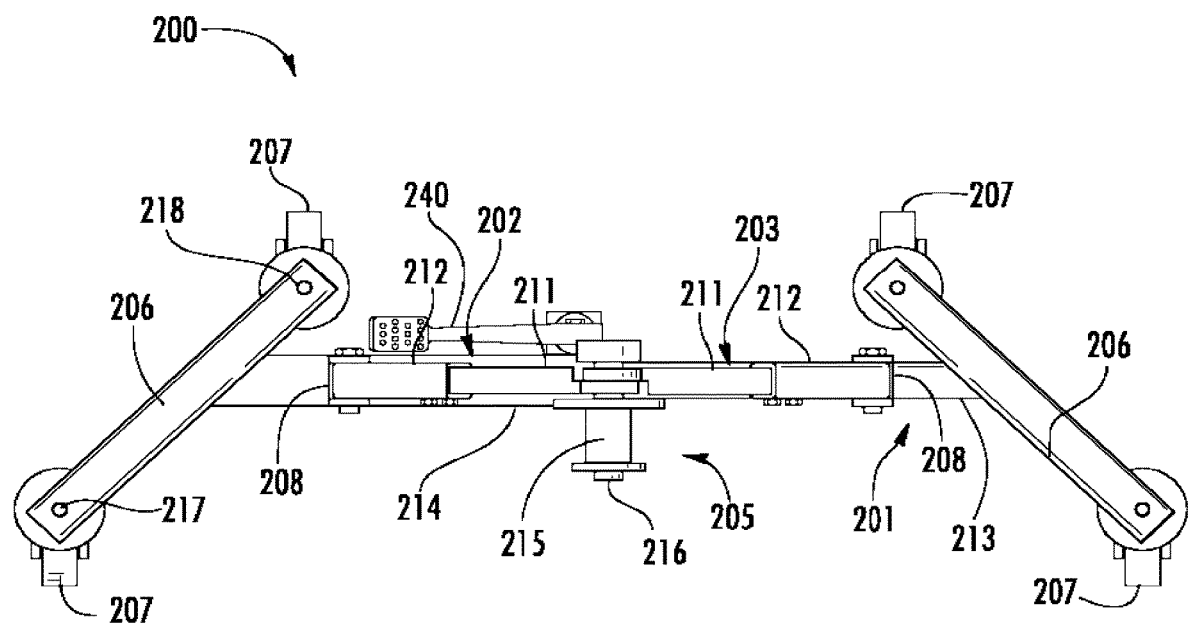
FIG. 2B is a top view of a device in an embodiment of the present invention.
Figure 2C:
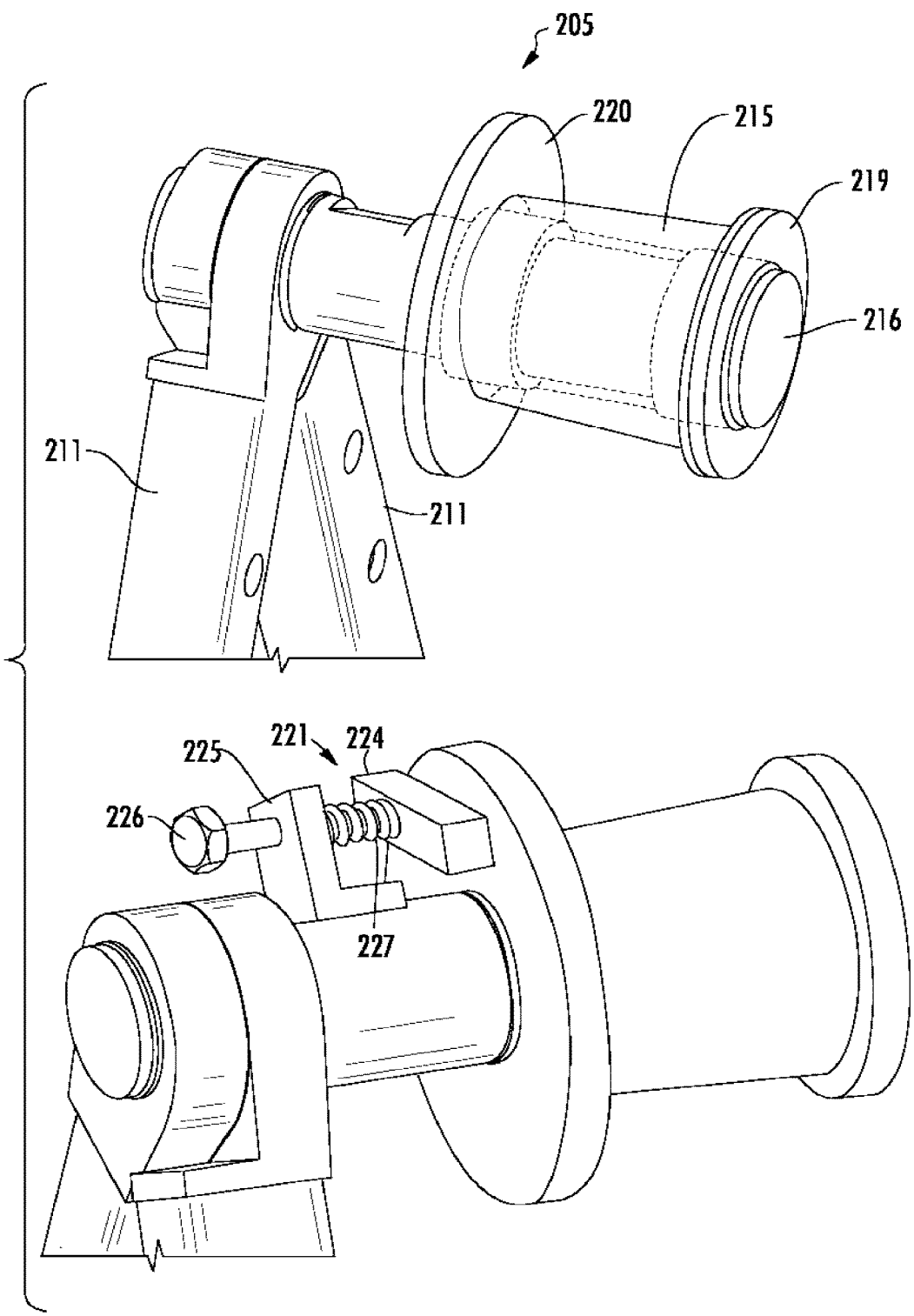
FIG. 2C is a perspective view of a reel support member in an embodiment of the present invention.
Figure 2D:
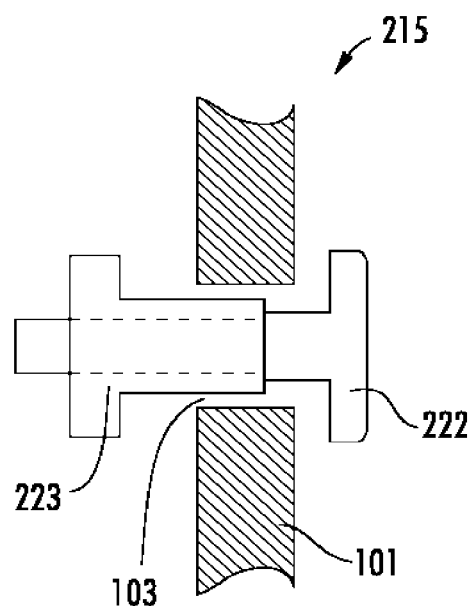
FIGS. 2D, 2E, and 2F are cross sectional views of a roller in various embodiments of the present invention.

In an embodiment, the roller 215 may be clamped to the flange 101, as shown in FIG. 2D. In this embodiment, the roller 215 may have male 222 and female 223 members. Once the roller 215 is inserted into the bore 103, the male 222 and female 223 portions are pulled toward one another, clamping them in place to the flange 101.

Figure 2E:
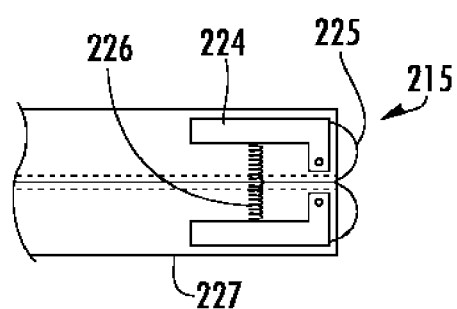
Figure 2F:
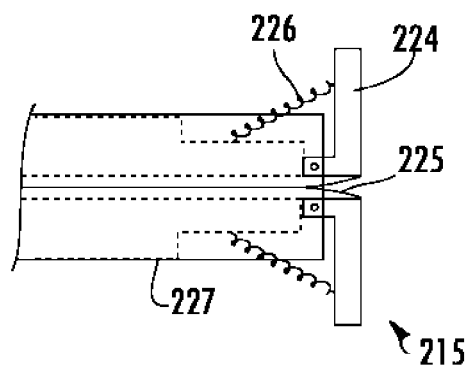

In another embodiment, shown in FIG. 2E-2F, the roller 215 may be inserted into the center bore 103 and clamped to the flange 101 using a housing 227 that comprises a pair of expansion mechanisms 224, strings 225 attached thereto, and springs 226 attached thereto. As the strings 225 are pulled outward of the roller 215, the expansion mechanisms 224 are pulled outwardly, expanding to a width that, in an embodiment, exceeds the width of the flange 101, thereby locking the roller 215 in place. To retract the expansion members 224, the tension on the string 225 should be released and the springs 226 will pull the expansion members 224 back into their housing 227. The roller 215 can then be retracted from within the center bore 103.

In an embodiment, a braking mechanism 221 (shown in FIG. 2C) may be used in connection with the reel support member 205. The braking mechanism 221 may comprise a caliper friction brake, a rotor and brake caliper, a spring-loaded brake, or any other brake known in the art that could be applied to roller 215, rim 104 and/or one or both flanges 101 to slow down, control and/or stop the winding/unwinding of the reel 100. As shown in FIG. 2C, the braking mechanism 221 may, in an embodiment, comprise a pad 224, optionally made of rubber or a similar frictional material, a bracket 225 that attaches the braking mechanism 221 to the spindle 216, a bolt 226, and a spring mechanism 227. Braking is achieved when the spring 227 presses the pad 224 against the outside of the moving roller 215, which slows the rotation of the roller 215 and, thereby, the reel. In addition, in an embodiment, the braking mechanism 221 may provide tension during winding and may help create a tighter wound material. Additionally, the braking mechanism may create drag during unwinding, preventing the material from being unwound too quickly. In an embodiment wherein a pair of devices 200 are utilized on either side of a reel 100, only one braking mechanism 221 may be utilized.

In an embodiment, the device 200 additionally comprises at least two crossbars 206, mounted or joined perpendicular to or at a particular angle at or near each opposing end of the center retractable member 201. In an embodiment, the crossbars 206 are welded to the center retractable member 201. The angle between the center retractable member 201 and each crossbar 206 may be any angle known in the art, may be adjustable, may be the same angle for each crossbar 206, or may be different for each crossbar 206. In an embodiment, the crossbars 206 are angled such that when the reel 100 is loaded onto the device, the reel circular flange 101 does not contact the device 200. In an embodiment, the angled orientation of the crossbars 206 may reduce bending stress and provide a smaller and lighter footprint for the device 200. The crossbars 206 may be of any length known in the art. If the device 200 is used in pairs, the crossbars 206 may have a shorter length than if the device 200 is designed to be used singly. In the latter embodiment, the crossbars 206 may be longer to support and balance the weight of the reel 100.

In an embodiment, the inventive device 200 comprises a means for telescopically moving the male 213 and female 214 members of the center retractable member 201 relative to one another to thereby alter the distance between the opposite ends of the center retractable member 201. In another embodiment, the inventive device 200 comprises a means for telescopically moving the male 211 and female 212 members of either or both angularly-oriented vertical support bars 202 and 203 relative to one another to thereby alter the distance between the ends of the angularly-oriented vertical support bars 202 and 203. In any of these embodiments, the telescoping means may raise the reel support member 205, thereby raising any engaged reel 100 off the floor.

In an embodiment, the telescoping means comprise at least one actuating piston 204. In an embodiment, the piston 204 may be a hydraulic piston. In an embodiment, the telescoping means may be a foot-operated jack 240, hand-crank jack, screw jack, mechanical power screw, electrical actuator, or any other mechanism known in the art that will retract and expand the telescoping center retractable member 201. FIG. 2b illustrates the foot-operated jack 240 that may retract and expand the telescoping center retractable member 201. In an embodiment, the actuating piston 204 can be located in varying positions on or within the inventive device 200. In a particular embodiment, the piston 204 may be located within the hollow center of the center retractable member 201. In this embodiment, the center retractable member 201 is hollow and has a cross section which is substantially rectangular, square, cylindrical, or any other shape known in the art, and which would provide enough space to mount a piston within. In a similar embodiment, the piston 204 may be located within the first angularly-oriented vertical support bar 202 or the second angularly-oriented vertical support bar 203. In still another embodiment, shown in FIG. 3, the piston 204 may be mounted and located beneath or adjacent the center retractable member 201 or adjacent any side of the first angularly-oriented vertical support bar 202 or the second angularly-oriented vertical support bar 203. In still another embodiment, the piston 204 may be located substantially vertically, connected to (a) the center of the center retractable member 201, on one end, and (b) the reel support member 205 or the joint of the first angularly-oriented vertical support bar 202 and the second angularly-oriented vertical support bar 203, on the other end. In an embodiment, the piston 204 is positioned such that one end of the piston 204 is affixed to the male member and the other end of the piston is affixed to the female member of any of the center retractable member 201, the first angularly-oriented vertical support bar 202, or the second angularly-oriented vertical support bar 203. In an embodiment, the piston 204 is welded into position.

In a particular embodiment, multiple pistons 204 may be utilized in the device 200. For example, a piston may be mounted within or adjacent to the center retractable member 201, the first angularly-oriented vertical support bar 202, and the second angularly-oriented vertical support bar 203 (or any combination thereof). In an embodiment, a piston 204 may be substituted entirely for either or both of the first angularly-oriented vertical support bar 202 and/or the second angularly-oriented vertical support bar 203.

The piston(s) 204 are used to raise and lower the reel support member 205 so that the device can be height adjusted in order to insert the reel support member 205 into the bore 103 of the reel 100 and/or after insertion, to raise the reel 100 off the ground, for maneuvering, moving, winding or unwinding of the reel 100. The piston 204 may be actuated via a foot pedal, hand crank, electronic device, or any other device known in the art to actuate pistons. While a piston 204 is described herein, it should be understood that any mechanism which can be used to expand and retract the device 200 may be utilized. For example, a crank, pump jack, screw jack, or hoist assembly could be utilized in connection with the invention.

In an embodiment of the invention, the device 200 comprises wheels 207, casters, or any other mechanism known in the art to aid in maneuvering the device. In this embodiment, the wheels 207 may engage the floor 308 to support the inventive device above the floor 308. The wheels 207 may be disposed on each end of the crossbars 206, at any location along the crossbars 206, at any location along the center retractable member 201, or any combination of the same. The wheels 207 may be disposed such that the reel 100 may be maneuvered, moved, and positioned easily, in any direction, by pushing the device 200. In an embodiment, the wheels 207 each have a braking mechanism that can be applied with pressure and locked into place. This may hold the apparatus and reel in place, but may allow winding and unwinding of the reel. In an embodiment, the wheels 207 are connected to the device 200 using bolts and nuts 217 which are fitted through holes 218 in the crossbars 206. In an embodiment, the wheels 207 are connected to the device via casters, which allow for 360 degree rotation of the wheels. Any number of wheels 207 may be utilized in the invention. In an embodiment, the device 200 comprises at least two wheels. In another embodiment, the device 200 comprises at least four wheels. Optionally, and as is discussed in more detail herein, device 200 may comprise leveling feet.

In an embodiment, each of the center retractable member 201, first angularly-oriented vertical support bar 202, second angularly-oriented vertical support bar 203, and/or the crossbars 206 may be constructed of steel, an aluminum alloy or any other material known in the art. Similarly, each of the center retractable member 201, first angularly-oriented vertical support bar 202, second angularly-oriented vertical support bar 203, and/or the crossbars 206 may have a substantially square, rectangular, cylindrical or any other shape or cross section.

Figure 3B:
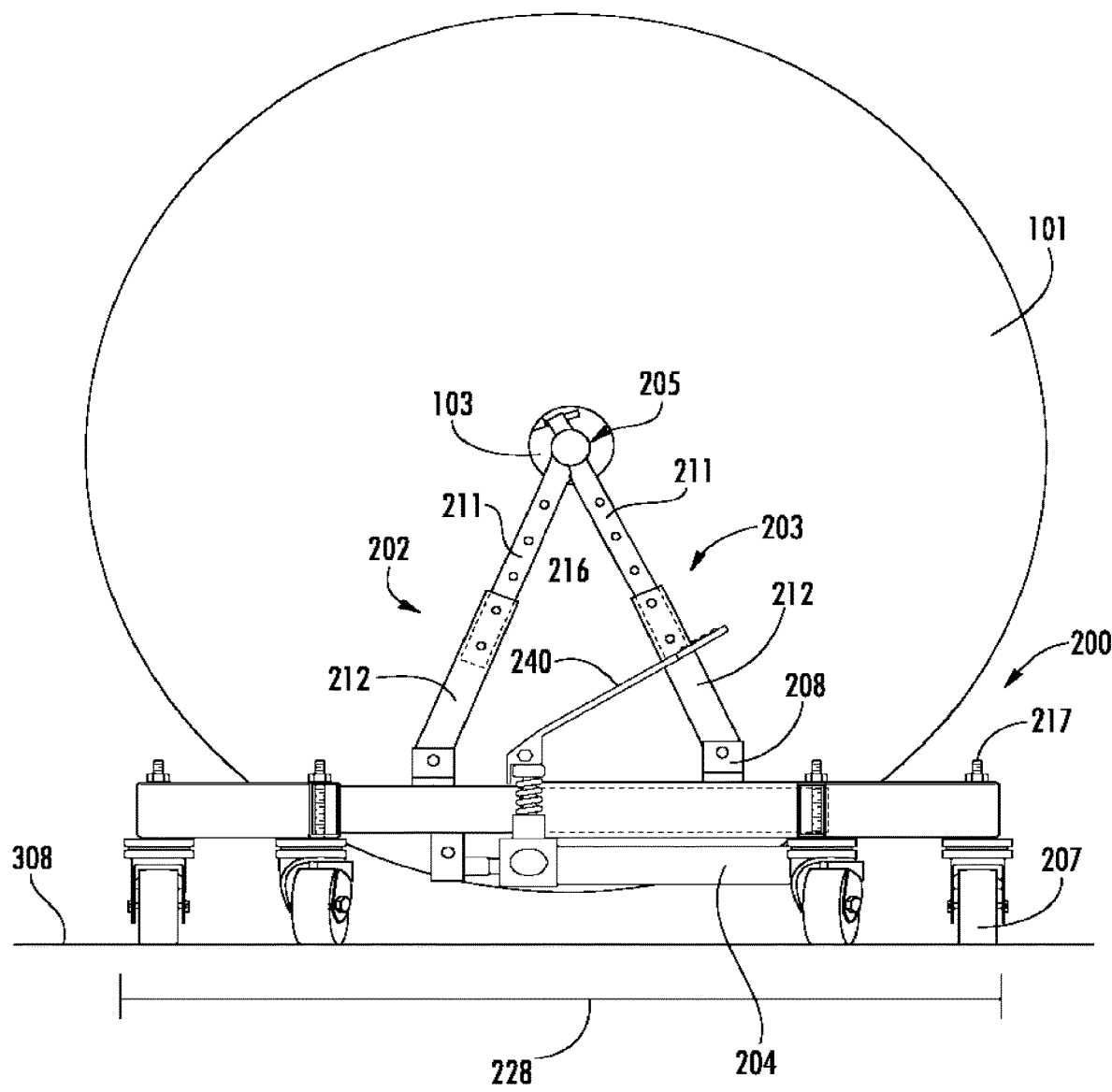
FIG. 3B is a front view of a device in an embodiment of the present invention, engaged with a reel and lifted off of the floor.

Shown in FIGS. 3A and 3B, in use, a separate device 200 is employed on each side of a reel 100, the pair of devices 200 sometimes referred to herein as the apparatus. Also shown in FIGS. 9B and 9C, in use, a single device 200 can be employed on one side of a reel 100. In an embodiment, the reel 100 is oriented upon the floor 308 so that its flange rims 104 rest upon the floor 308 and the barrel 102 is arranged substantially horizontally to the floor 308. The reel support member 205 of each device 200 is height adjusted, if needed, using the telescoping means (a piston 204, in an embodiment), so that the height of the reel support member 205 is in horizontal registry with the height of the center bore 103 of the reel 100. A reel support member 205 is then inserted into each side of the bore 103.

The height of the reel support member 205 (and, thus, the reel 100 itself) may then be adjusted by using the telescoping means (the piston 204 in an embodiment). In this embodiment, if center retractable member 201 is retracted using the piston 204, the opposite ends of the center retractable member 201 are drawn closer together, the first angularly-oriented vertical support bar 202 and the second angularly-oriented vertical support bar 203 are drawn closer together, decreasing the angle between them, the height of the reel support member 205 is raised, and thereby, the height of the reel 100 itself is raised. In this embodiment, the reel support member 205 may be raised to a height wherein the rims 104 of the flanges 101 are no longer in contact with the floor 308. This height should be sufficient to accommodate rotation of the reel 100 about its elongated axis 105 and/or movement of the reel 100 through use of the wheels 207. In some embodiments, the raised height of the reel 100, when using the inventive device, may lift the rims 104 of the flanges 101 less than an inch from the floor 308.

Figure 9B:
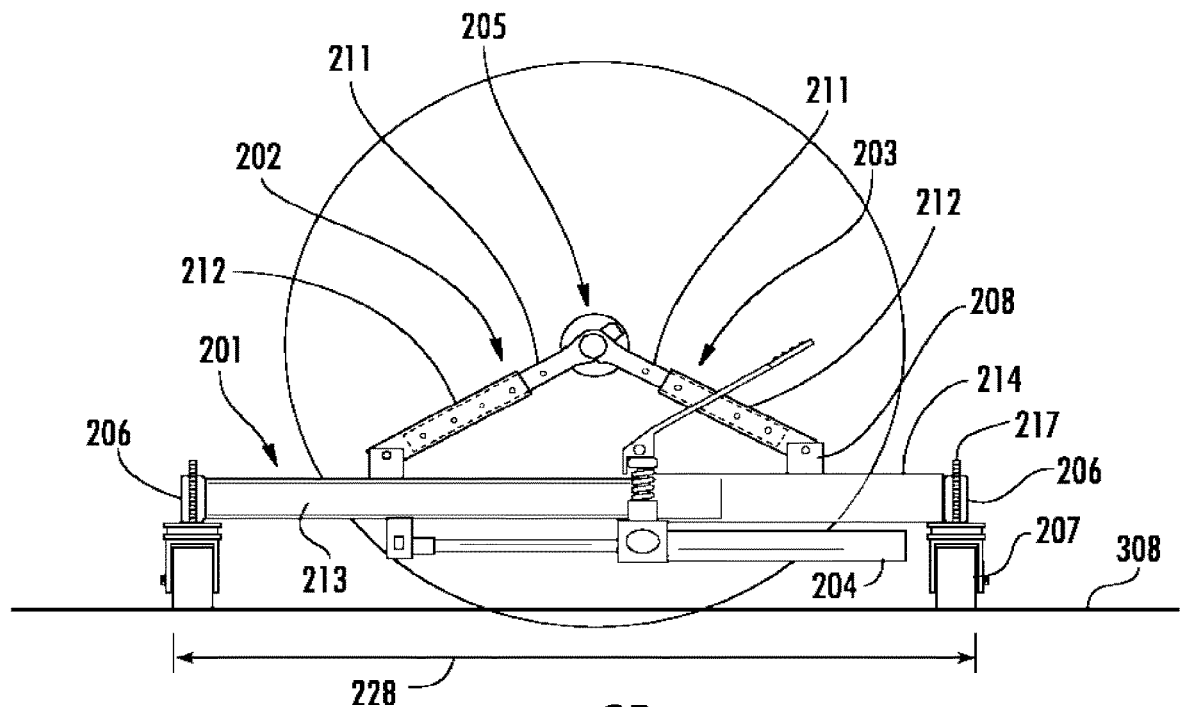
FIG. 9B is a front view of a device in an embodiment of the present invention, engaged with a reel.
Figure 9C:
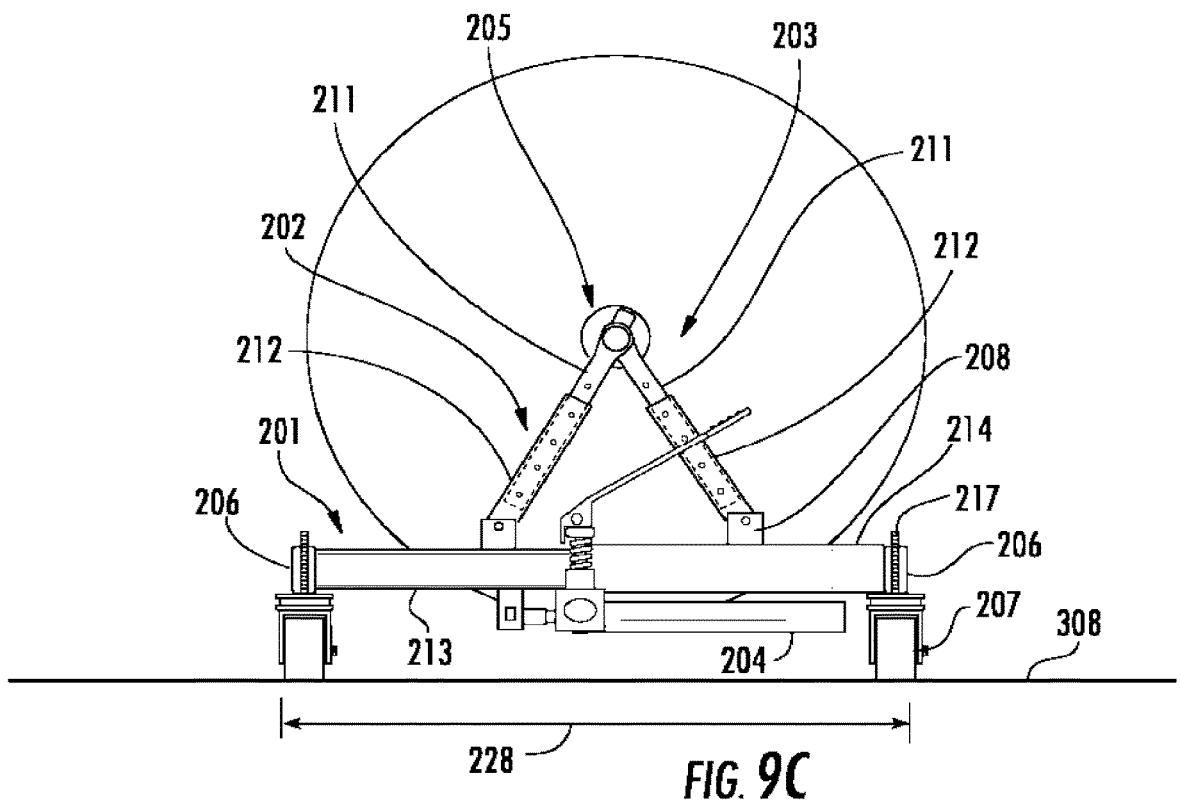
FIG. 9C is a front view of a device in an embodiment of the present invention, engaged with a reel and lifted off of the floor.

FIGS. 3A and 9B illustrate an embodiment of device 200, wherein the center retractable member 201 is fully expanded. In this position, the reel support member 205 may be positioned at an appropriate height for insertion into the bore 103 of the reel 100 while the rim 104 of the circular flange 101 is positioned on the floor 308. FIGS. 3B and 9C illustrate an embodiment of device 200, wherein the center retractable member 201 is fully retracted. In this position, the device 200 may lift the rim 104 of the circular flange 101 to a height that is elevated above the floor 308. It should be understood that the device 200 may be adjusted to any position between the fully expanded and fully retracted positions of the center retractable member 201, in order to appropriately lift and lower the reel 100. In the elevated position, the reel 100 may be rotated about its elongated axis 105 to wind or unwind the materials contained on the elongated barrel 102.

In embodiment, a safety strap or other mechanism may be used to secure each of the devices 200 to one another when the devices 200 are supporting a reel 100. In this embodiment, the safety strap may connect a first end of the crossbar 206 located to the left of the reel 100 to the first end of the crossbar 206 located to the right of the reel 100. In an embodiment, safety straps are implemented on both the front and back of the reel 100. The safety straps may prevent the devices 200 from moving away from one another and potentially dropping the reel 100.

In an embodiment, the length of the center retractable member 201, in its fully extended position, may be between about 35 and 45 inches. In another embodiment, the length of the center retractable member 201, in its fully extended position, may be between about 37 and 41 inches.

Likewise, in an embodiment, the length of the center retractable member 201, in its fully retracted position, may be between about 25 and 35 inches. In another embodiment, the length of the center retractable member 201, in its fully retracted position, may be between about 27 and 31 inches.

The length and angles of the first angularly-oriented vertical support bar 202 and the second angularly-oriented vertical support bar 203 are variable based upon the size of the reel that is being supported. In an embodiment, the length of the first angularly-oriented vertical support bar 202 and the second angularly-oriented vertical support bar 203 may be between about 13 and 20 inches. In a particular embodiment, the length of the first angularly-oriented vertical support bar 202 and the second angularly-oriented vertical support bar 203 may be between about 14 and 15 inches. In yet another embodiment, the length of the first angularly-oriented vertical support bar 202 and the second angularly-oriented vertical support bar 203 may be between about 18 and 19 inches.

In an embodiment, the length of the crossbars 206 may be between about 16 and 18 inches. In a particular embodiment, the length of the crossbars 206 is about 17 inches.

In an embodiment, the angle between the first angularly-oriented vertical support bar 202 and the second angularly-oriented vertical support bar 203, when the device 200 is in its fully retracted position, is between about 45 and 49 degrees. In a further embodiment, the angle between the first angularly-oriented vertical support bar 202 and the second angularly-oriented vertical support bar 203, when the device 200 is in its fully retracted position, is about 47 degrees. In another embodiment, the angle between the first angularly-oriented vertical support bar 202 and the second angularly-oriented vertical support bar 203, when the device 200 is in its fully retracted position, is between about 60 and 65 degrees. In a further embodiment, the angle between the first angularly-oriented vertical support bar 202 and the second angularly-oriented vertical support bar 203, when the device 200 is in its fully retracted position, is about 62 degrees.

In an embodiment, the angle between the first angularly-oriented vertical support bar 202 and the second angularly-oriented vertical support bar 203, when the device 200 is in its fully extended position, is between about 83 and about 87 degrees. In a further embodiment, the angle between the first angularly-oriented vertical support bar 202 and the second angularly-oriented vertical support bar 203, when the device 200 is in its fully extended position, is about 85 degrees. In another embodiment, the angle between the first angularly-oriented vertical support bar 202 and the second angularly-oriented vertical support bar 203, when the device 200 is in its fully extended position, is between about 120 and about 125 degrees. In a further embodiment, the angle between the first angularly-oriented vertical support bar 202 and the second angularly-oriented vertical support bar 203, when the device 200 is in its fully extended position, is about 121 degrees.

In an embodiment, the angle between the first angularly-oriented vertical support bar 202 or the second angularly-oriented vertical support bar 203 and the crossbar 206 is between about 25 and about 35 degrees. In a particular embodiment, the angle between the first angularly-oriented vertical support bar 202 or the second angularly-oriented vertical support bar 203 and the crossbar 206 is about 30 degrees.

In an embodiment, the devices of the present invention can support reels of any weight. In a particular embodiment, the devices of the present invention can support reels having a weight of up to about 4000 lbs. In another embodiment, the devices of the present invention can support reels having a flange 101 diameter of up to about 48 inches. In still another embodiment, the devices of the present invention can support reels having a flange 101 diameter of from about 36 inches to about 48 inches.

Figure 5A:
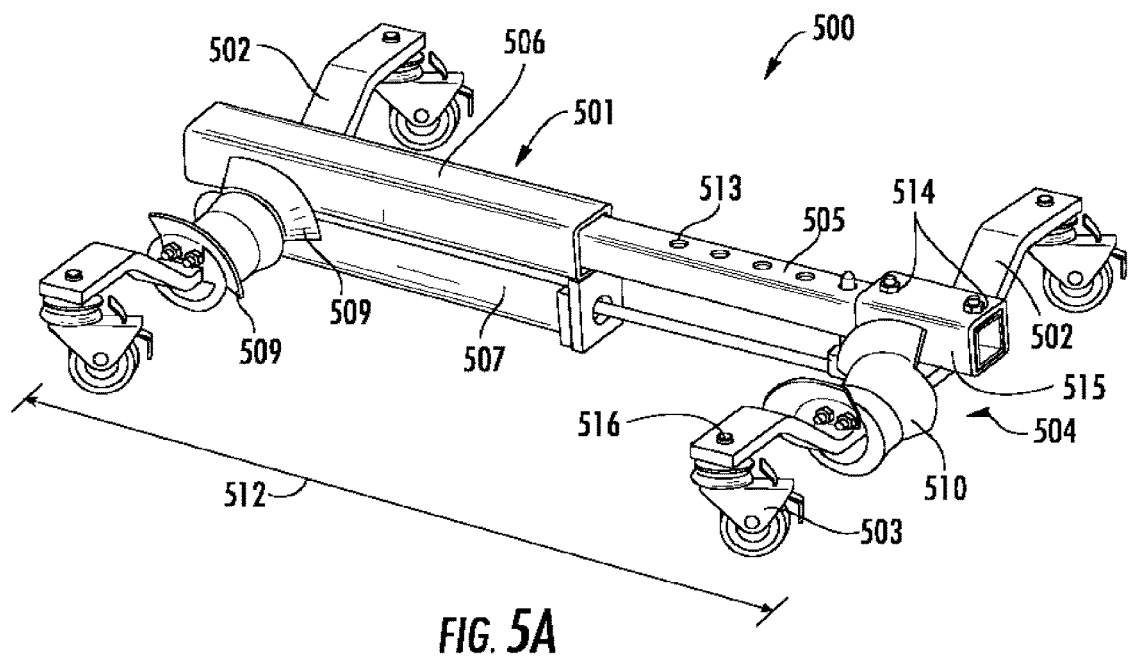
FIG. 5A is a perspective view of a device in an embodiment of the present invention.

Referring now to FIGS. 5A-7B, another embodiment of the present invention is shown. In this embodiment, as shown in FIG. 5A, the device 500 (which would be used in pairs in an embodiment) comprises a flange support member on wheels 503. It should be understood that in accordance with other example embodiments, as shown in FIG. 5B, the device 500 may comprise a flange support member on leveling feet 508, as further described below. Each device 500 may have an elongated retractable frame 501 which has a first end and a second end that are adjustable relative to one another. In an embodiment, the elongated retractable frame 501 may comprise a male/female telescoping arrangement that can extend and retract. At least a portion of the male member 505 may be accepted by the female member 506 through an open end thereof. The male member 505 and the female member 506 may be sized to permit the members to telescopically move relative to one another and thereby permit the spaced distance 512, measured between the opposite ends of the male member 505 and female member 506, to be altered. Said another way, the length of each device 500 can be adjusted by moving the male 505 and female 506 members of the retractable frame 501 relative to one another so that the spaced distance 512 is increased or decreased, respectively. Though a particular embodiment described herein utilizes a male and female telescoping configuration, it should be understood that the elongated retractable frame 501 may comprise a rod and channel configuration, a track and rail configuration, or any other configuration known in the art to allow the first end and second end of the elongated retractable frame 501 to be adjusted relative to one another.

The elongated retractable frame 501 is fixedly attached at each end to a crossbar 502. In an embodiment, the crossbars 502 are each unitary plates which have a substantially horizontal lower portion 520, an angled middle portion 521, and a substantially horizontal upper portion 522.

In an embodiment, as shown in FIG. 5A, each crossbar 502 may have wheels or casters 503 (described more fully above) fixedly attached to the underside of the upper portion 522 of the crossbars 502. Positioning the wheels or casters 503 on the underside of the upper portion 522 of the crossbars 502 may permit the use of larger wheels, making the device 500 easier to roll. As such, in an embodiment, each device 500 has at least four wheels 503. In another embodiment, each device 500 has at least two wheels 503. The wheels or casters 503 may be attached to the underside of the upper portion 522 of the crossbar 502 with screws or bolts 516. The bolts 516 may be engaged with throughholes in the ends of the upper side 522 of the crossbars 502. In an embodiment, the wheels 503 support the crossbars 502 above the floor 511 and are capable of rotating about vertical axes to permit the devices 500 to be moved, or pushed, in any direction across the floor 511.

In an embodiment, at least one of the crossbars 502 may have a substantially square or rectangular tube 515 disposed on the lower portion 520, substantially perpendicular to the crossbar 502. In an embodiment, the tube 515 is fixedly attached, optionally through welding, to the upper side of the lower portion 520. The tube 515 may be sized to telescopically receive the male member 505 of the retractable frame 501. The male member 505 of the retractable frame 501 may, in an embodiment, have a plurality of openings 513 defined therealong and the tube 515 may also have one or more similarly-sized defined openings 514 therealong. The openings 513 and 514 may be moved into an aligned relationship (i.e. into vertical registry with one another) and may be secured in place through said openings 513 and 514, for example, using nuts and bolts. In this embodiment, the male member 505 is secured to the tube 515 (and, thereby, the crossbar 502). In an embodiment, this process locks the device 200 in position. In an embodiment, this process may be used to customize the device 200 based upon the size of the reel 100 that it will be supporting.

In an embodiment, each crossbar 502 additionally has a roller carrier 504 (exploded view shown in FIG. 6A and perspective view shown in FIG. 6B) positioned on the lower portion 520 of the crossbar 502. Positioning the roller carrier 504 on the lower portion 520 of the crossbars 502 may provide the advantage of allowing the device 500 to contact the flange 101 of the reel 100 at a lower point than would otherwise be possible. Because the intersection point of the device 500 on the flange 101 is lower, the forces pushing against the device 500 due to the weight of the reel 100 may be more vertical, and the device 500 may be able support reels 100 having a greater weight. Said another way, the strength required to support the reel 100 by the device 500 may be less if the device 500 contacts the flange 101 at a lower point. Thus, an embodiment wherein the roller carrier 504 is positioned on the lower portion 520 of the crossbars 502 may provide a mechanically stronger device 500. The device 500 may then be smaller, may weigh less, and may be less expensive to produce.

In an embodiment, the roller carrier 504 comprises a semi-cylindrical portion 543. In an embodiment, the semi-cylindrical portion 543 of each roller carrier 504 may be positioned parallel to the crossbar 502 and essentially perpendicular to the retractable frame 501. In an embodiment, the semi-cylindrical portion 543 may be semi-cylindrical in shape on its upper side. The upper side of the semi-cylindrical portion 543 may be shaped and sized such that it receives a roller 510, which may rotate axially about the semi-cylindrical portion 543.

In an embodiment, the semi-cylindrical portion 543 may have a flat wall on its underside 517 and a flat lower sidewall 518. The underside 517 and lower sidewall 518 of the semi-cylindrical portion 543 may be designed, in an embodiment, such that they are received by and sit flush with the upper side of the lower portion 520 and the sidewall of the lower portion 520, respectively. In an embodiment, the semi-cylindrical portion 543 may be fixedly attached to the lower portion 520 of the crossbar 502. In an embodiment, the semi-cylindrical portion 543 may be welded to the lower portion 520 of the crossbar 502. In another embodiment, the lower portion 520 of the crossbar 502 has bolts 519 secured within through holes in the lower portion 520. In this embodiment, the semi-cylindrical portion 543 may comprise partial screw holes on its underside 517 that can be aligned with the bolts 519 and the bolts 519 can be screwed into place, to secure the semi-cylindrical portion 543 to the lower portion 520 of the crossbar 502.

In an embodiment, each roller carrier 504 further comprises at least one, and optionally two, flange guards 509 positioned on either end of the semi-cylindrical portion 543. In an embodiment, the flange guards 509 comprise a disc portion and an angled portion 524, which extends radially from the disc portion. The angled portion 524 may or may not extend around the full circumference of the disc portion 523. The angled portions 524 may each be angled away from the semi-cylindrical portion 543. The flange guards 509 may be fixedly attached to each end of the semi-cylindrical portion 543 in an embodiment. In an embodiment, the flange guards 509 may each comprise bolts 525 that are secured within through holes along the disc portion of the flange guards 509. The bolts 525, in an embodiment, can be aligned with threaded holes 526 on each end of the semi-cylindrical portion 543, to securely fix the flange guards 509 to the semi-cylindrical portion 543. In this embodiment, the threaded holes 526 do not penetrate the curved surface of the semi-cylindrical portion 543, providing a smooth surface for the bearing 542.

In an embodiment, at least one, and optionally two, thrust bearings 523 may be positioned between the roller 510 and the flange guard 509. Moreover, in a further embodiment, each roller 510 may further comprise radial bearings 542 positioned between the central through-opening 527, and the semi-cylindrical portion 543, to allow for smooth rotation.

As noted above, in an embodiment, the semi-cylindrical portion 543 receives the roller 510, which may rotate axially about the semi-cylindrical portion 543. The roller 510 may rotate about an axis that is substantially parallel to the underlying floor 511. The roller 510 may have, in an embodiment, a central through-opening 527 which is received by the radial bearings 542. The radial bearings 542 may be received by the semi-cylindrical portion 543. In this embodiment, the roller 510 may be positioned between the flange guards 509, but may rotate freely. The semi-cylindrical portion 543 and the flange guards 509, however, may be fixed in place in this embodiment and do not rotate.

In an embodiment, the roller 510 may have a substantially flat cylindrical surface which is adapted to receive the rim 104 of the reel 100 when the device 500 is placed in an operative relationship therewith. In another embodiment, the roller 510 may comprise a track, may be v-shaped, c-shaped, or u-shaped such that the rim 104 of the reel fits within such track, v-shape, c-shape, or u-shape. In a particular embodiment, the roller 510 has a substantially flat center surface 530, which primarily contacts and engages the rim 104 of the reel 100, and the edges 531 of the roller 510 each taper upward from the flat center surface 530, discouraging the rim 104 from sliding in either direction on the roller 510. In an embodiment, the outer surface of the roller 510 may be smooth, ridged, surrounded by a band, coated with an elastomeric material, may conform to the contours of the rim 104, or may use any other material or mechanism which provides the surface of the roller 510 with a degree of frictional resistance to movement of the rim 104. This embodiment may provide improved braking and drag during the winding and/or unwinding of the material.

In an embodiment, the inventive device 500 comprises at least one actuating piston 507 or similar telescoping means, as is known in the art and is more fully described above. In an embodiment, the actuating piston 507 can be located in varying positions along the retractable frame 501. In a particular embodiment, the piston 507 may be located within the retractable frame 501. In an embodiment, the piston 507 is positioned such that one end of the piston 507 is affixed to the male member 505 and the other end of the piston is affixed to the female member 506 of the retractable frame 501. In an embodiment, the piston 507 may be affixed to the bottom side of the retractable frame, the top side of the retractable frame 501, or adjacent either side of the retractable frame 501. In an embodiment, the piston 507 is welded into position. In an embodiment, the piston 507 is used to extend and retract the length of the retractable frame 501 by moving the male member 505 and the female member 506 relationally.

Figure 5B:
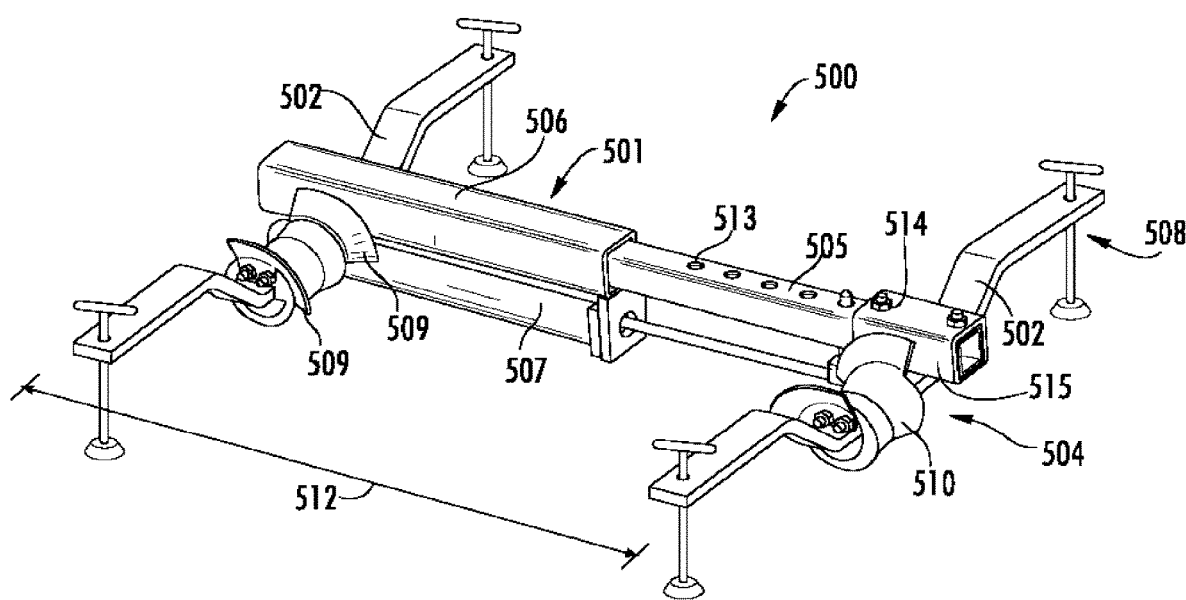
FIG. 5B is a perspective view of a device in a further embodiment of the present invention.
Figure 6A:
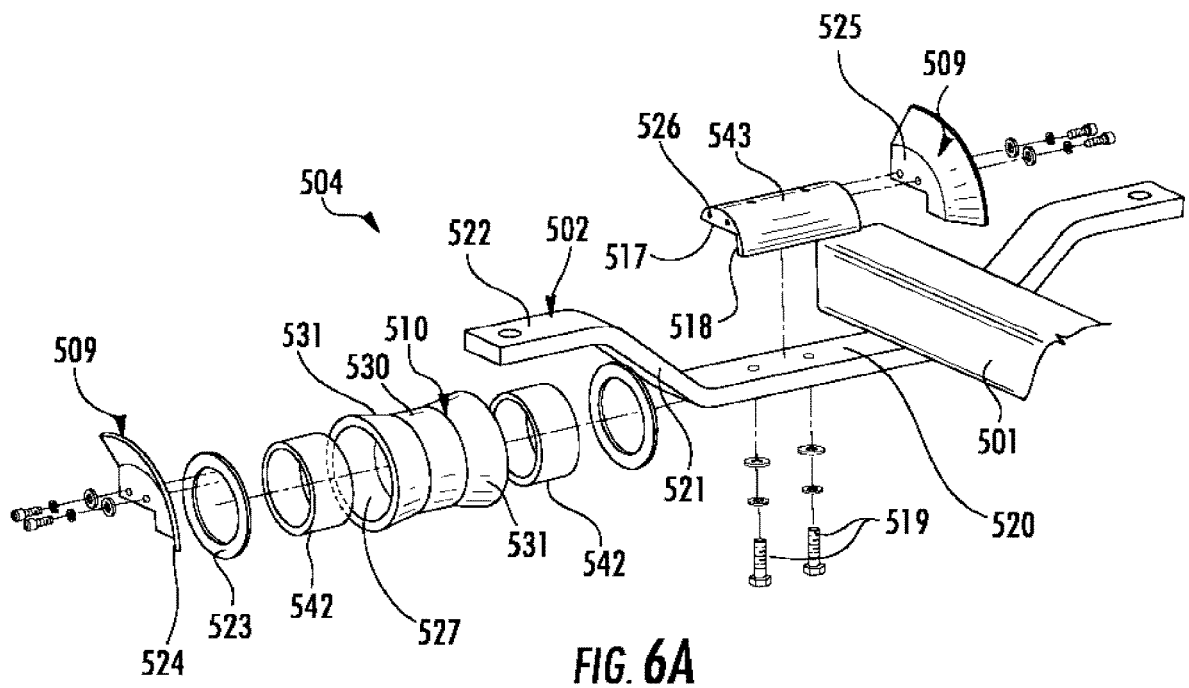
FIG. 6A is an exploded perspective view of a roller carrier in an embodiment of the present invention.
Figure 6B:
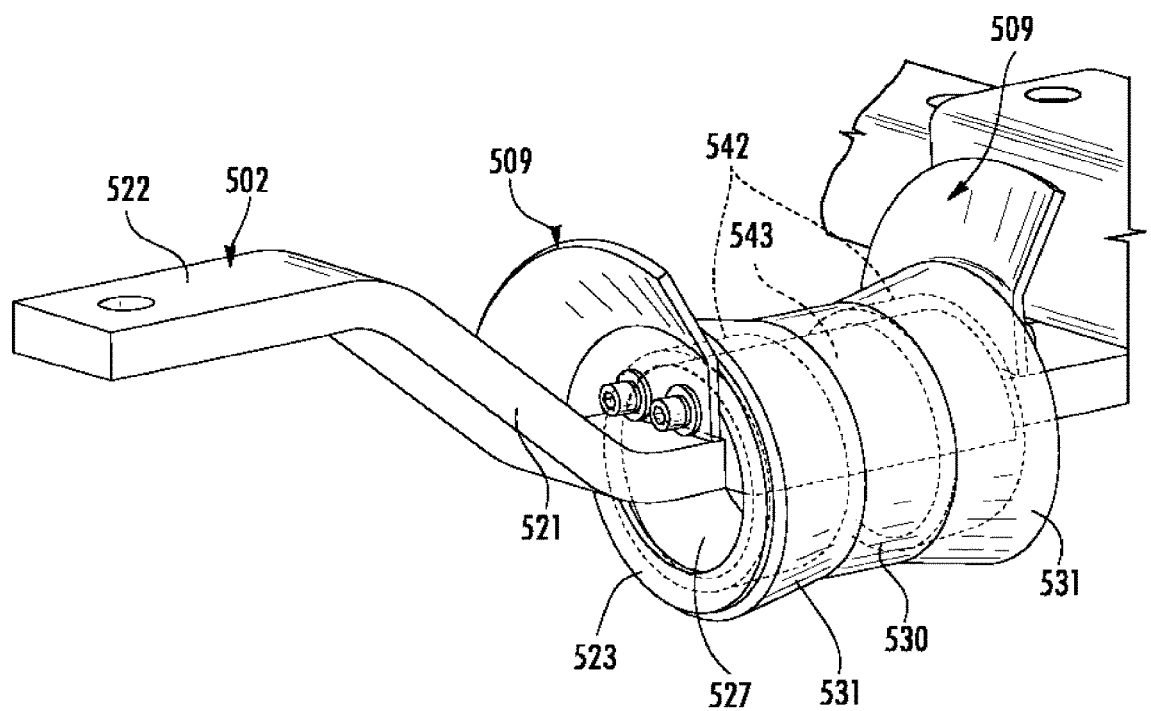
FIG. 6B is a perspective view of a roller carrier in an embodiment of the present invention.
Figure 7A:
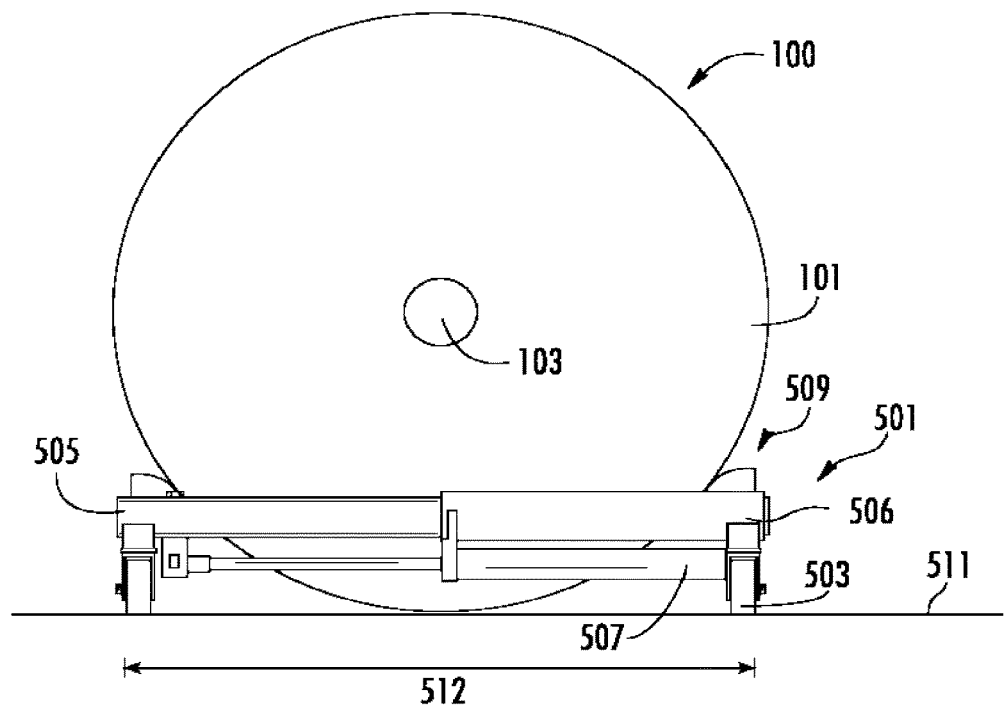
FIG. 7A is a front view of a device in an embodiment of the present invention, engaged with a reel.
Figure 7B:
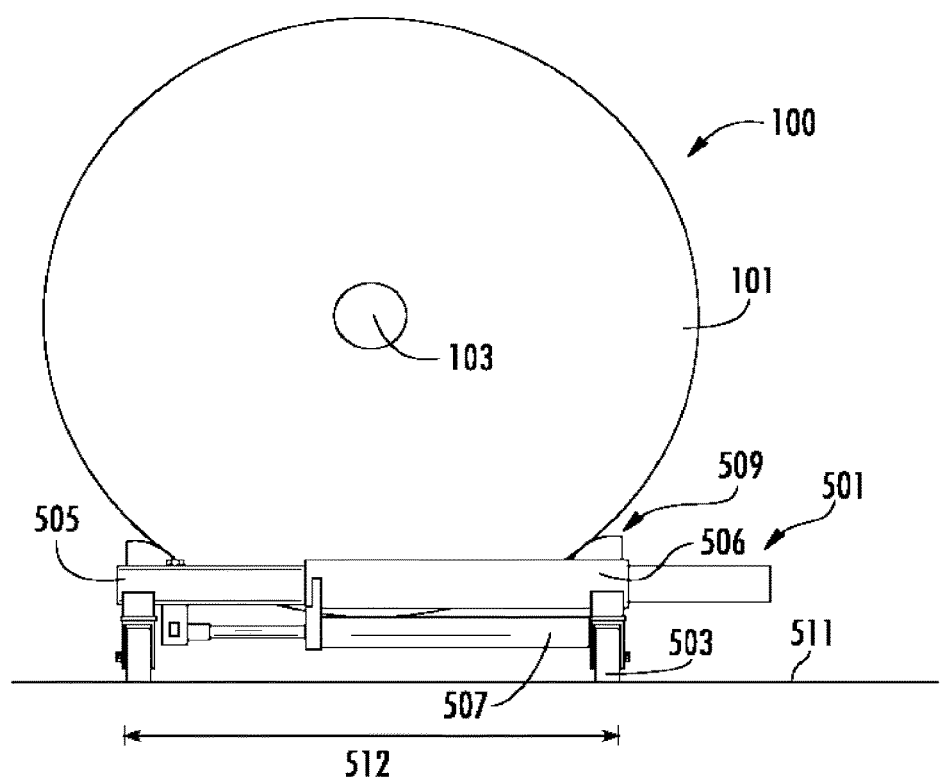
FIG. 7B is a front view of a device in an embodiment of the present invention, engaged with a reel and lifted off of the floor.

In a particular embodiment, as shown in FIG. 5B, the device 500 (or any device described herein) may include leveling feet 508. The leveling feet may be, in an embodiment, disposed at each end of the upper portion 522 of the crossbars 502. In an embodiment, four leveling feet are provided at each end of the upper portion 522 of the crossbars 502. The leveling feet 508 may be utilized to level and secure the device 500 in a stationary position (a) before and/or after moving or maneuvering the reel 100; and/or (b) before, during, and/or after winding or unwinding the material from the barrel 102 of the reel 100. Any means or mechanism known in the art may be utilized for the leveling feet 508.

In use, a separate device 500 is brought into alignment with each flange 101 of a reel 100. In this embodiment, the retractable frames 501 may each begin in their fully extended positions. The size of the reel 100 will commonly dictate the initial spaced distance 512 between the opposite ends of the retractable frames 501. The pistons 507 may be required to extend the retractable frames 501 into their fully extended positions or into a more fully extended position. In this embodiment, the retractable frame 501 of each device 500 may be positioned parallel with and adjacent to the opposite and corresponding flanges 101 of the reel 100. The roller carriers 504 of each device 500 may be positioned adjacent to the rim 104, closest to where the rim 104 engages with the floor 511. The rollers 510 may be positioned perpendicular to, and in registry with, the rim 104. The flange guards 509, in this embodiment, may be positioned on either side of the rim 104. In an embodiment, the rim 104 is positioned such that it contacts each of the rollers 510 and is enveloped between the flange guards 509.

As each piston 507 is actuated to retract the spaced distance 512 of its respective retractable frame 510, the roller carriers 504 of each device 500 are also drawn closer together. As the roller carriers 504 draw closer together, the rollers 510 engage the rim 104 of the reel 100 more securely and, eventually, as the roller carriers 504 continue to draw closer together, the devices 500 lift the reel 100 to an elevated position wherein the rim 104 is no longer in contact with the floor 511.

With the reel 100 mounted upon the devices 500 and in a lifted position, the reel 100 can moved or maneuvered by manually pushing the mounted reel 100. In an embodiment, no additional equipment is required to move or maneuver the reel 100. In this lifted position, the barrel 102 of the reel 100 may also be wound or unwound with ease. In this embodiment, the rollers 510 rotate freely, allowing the reel 100 to rotate about its axis 105 and the material to be wound or unwound. As noted above with regard to device 200, a brake may be applied to device 500 in a similar manner to slow down, control and/or stop the winding/unwinding of the reel 100.

In an embodiment, in the fully retracted position, the male member 505 protrudes beyond the distal end of the female member 506. In this embodiment, there may be a through hole in the male member 505 which may receive and engage a pin, bolt or other device. This mechanism may be used to lock the device and prevent the male member 505 from further expanding.

To remove the device 500 from the reel 100, the piston 507 is actuated to increase the spaced distance 512 of its respective retractable frame 510. The roller carriers 504 slowly move further from one another, allowing the rim 104 of the reel 100 to return into engagement with the floor 511. As the roller carriers 504 slowly move even further from one another, the device 500 can be removed from its location on the floor 511, adjacent the corresponding reel flange 101, and stored or reused.

In an embodiment, the length of retractable frame 501, in its fully extended position, is between about 35 and 40 inches. In a particular embodiment, the length of retractable frame 501, in its fully extended position, is about 38 inches. In an embodiment, the length of retractable frame 501, in its fully retracted position, is between about 20 and 25 inches. In a particular embodiment, the length of retractable frame 501, in its fully extended position, is about 21 inches.

In an embodiment, the length of the crossbars 502 may be between about 15 and 19 inches. In a particular embodiment, the length of the crossbars 502 is about 17 inches.

Figure 8:
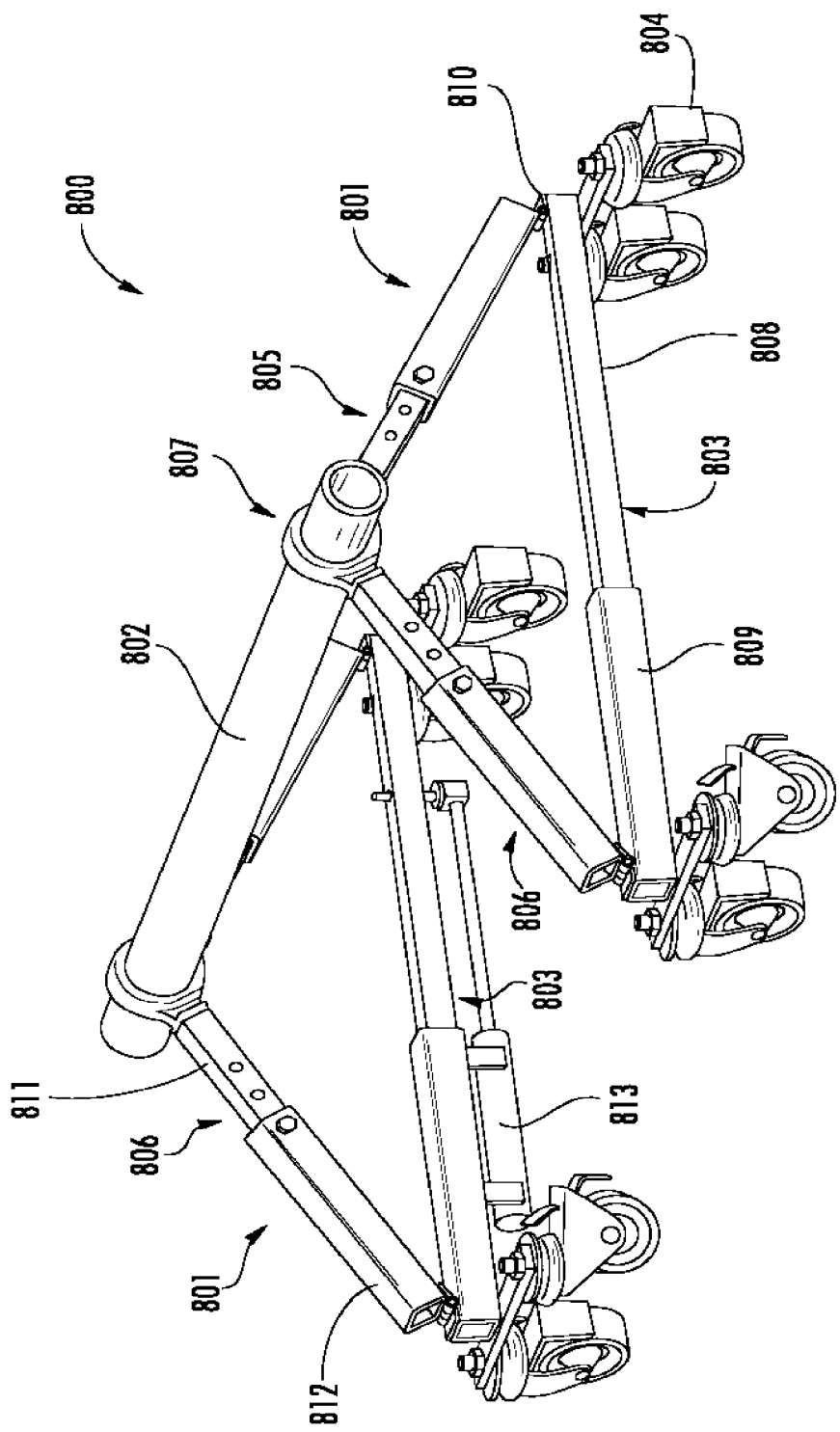
FIG. 8 is a perspective view of a device in an embodiment of the present invention.

Turning now to FIG. 8, a device 800 is shown. The device 800, generally employs two A-frame support structures 801 removably connected by a reel bore bar 802. The reel bore bar 802 may be comprised of a lightweight material such as aluminum, in an embodiment. The A-frame support structures 801 each have horizontal center retractable member 803, optionally supported on one or more wheels or casters 804. The center retractable member 803 is pivotally attached at each end, respectively, to a first angularly-oriented vertical support bar 805 and a second angularly-oriented vertical support bar 806. The first angularly-oriented vertical support bar 805 and the second angularly-oriented vertical support bar 806 are pivotally attached to each other at their distal ends 807. In an embodiment, the first angularly-oriented vertical support bar 805 and the second angularly-oriented vertical support bar 806 are removably connected to each other at their distal ends 807, such that they may be aligned and the bore bar 802 can be passed through both of them, but without the bore bar 802 in place, they may not be connected at all.

In an embodiment, the center retractable member 803 has a first end and a second end which are adjustable relative to each other. In an embodiment, the center retractable member 803 may comprise a male/female telescoping configuration.

In this embodiment, at least a portion of the male member 808 is accepted by the female member 809 through an open end thereof. The male member 808 and the female member 809 are sized to permit the members to telescopically move relative to one another and thereby permit the spaced distance between the ends of the center retractable member 803 to be altered. Though a particular embodiment described herein utilizes a male and female telescoping configuration, it should be understood that the center retractable member 803 may comprise a rod and channel configuration, a track and rail configuration, or any other configuration known in the art to allow the first end and second end of the center retractable member 803 to be adjusted relative to one another.

As noted above, the first angularly-oriented vertical support bar 805 and the second angularly-oriented vertical support bar 806 may be pivotally joined to each other at their distal ends and may each be pivotally mounted on the center retractable member 201 at their proximal ends, creating the A-frame support.

In an embodiment, a pair of plates 810 which extend upwardly is disposed along the top of the center retractable member 803. In an embodiment, the plates 810 are welded to the center retractable member 803. In an embodiment, the plates 810 define at least one set of aligned through-openings. The proximal ends of the first angularly-oriented vertical support bar 805 and the second angularly-oriented vertical support bar 806 may define similar aligned through-openings. The first angularly-oriented vertical support bar 805 and the second angularly-oriented vertical support bar 806 can be pivotally connected to the center retractable member 803 by aligning the through-openings of the plates 810 with the through-openings of the first angularly-oriented vertical support bar 805, on one hand, and the through-openings of the second angularly-oriented vertical support bar 806, on the other hand. A bolt, pin, or any other mechanism known in the art may be inserted through the aligned through-openings to create a pivoting point. The shank of the bolt, pin, or other mechanism should extend through both of the aligned through-openings in each set. In an embodiment, the bolt, pin, or other mechanism is then secured in place with a nut, pin, or other mechanism known in the art.

In an embodiment, the first angularly-oriented vertical support bar 805 and the second angularly-oriented vertical support bar 806 are each male/female telescoping members. In this embodiment, each of the support bars 805 and 806 may define at least one set of aligned through-openings in its male member 811 and its female member 812. The sets of aligned through-openings may be vertically disposed with respect to one another. As the male member 811 is inserted into the female member 812, the through-openings of each may be aligned and a bolt, pin, or any other mechanism known in the art may be inserted therethrough. In an embodiment, this process locks the device 800 in position.

Each of the center retractable member 803, the first angularly-oriented vertical support bar 805, and the second angularly-oriented vertical support bar 806 may be of any length known in the art. The angles between the center retractable member 803, the first angularly-oriented vertical support bar 805, and the second angularly-oriented vertical support bar 806 may be variable as the retractable member 803 is adjusted.

In an embodiment, each of the center retractable member 803, first angularly-oriented vertical support bar 805, and/or second angularly-oriented vertical support bar 806 may be constructed of an aluminum alloy, steel, or any other material known in the art and may have a substantially square, cylindrical, rectangular, or any other cross section known in the art.

As discussed above with regard to other embodiments, the device 800 may have leveling feet.

The reel bore bar 802 may be generally cylindrical in shape and may extend at least slightly longer than the length of the barrel 102 of the reel 100, such that it can be engaged on each end of the barrel 102 with the A-frame support structure 801.

As an alternative to being supported on wheels or casters 804, the device 800 may be mounted directly on a surface of a carrying structure, such as a pallet. In this embodiment, a forklift or the like may be employed to move the reel 100 into place. However, once in the desired position, the device 800 allows the reel 100 to be wound or unwound while remaining mounted on the device 800.

Optionally, one or more pistons 813 may be provided in connection with device 800, generally as discussed with reference to device 200.

In use, the A-frame support structures 801 may be placed on either side of a reel 100. The reel may be position on the ground or may be already lifted off the ground. The horizontal support bar 803, first angled vertical telescoping member 805, and second angled vertical telescoping member 806 are adjusted to the height of the center bore 103 of the reel 100. The reel bore bar 802 is then inserted through the center bore 103 of the reel 100 and is connected to the distal end 807 of the first angled vertical telescoping member 805 and the second angled vertical telescoping member 806 of each side of the reel 100. The reel bore bar 802 may be removably fixed to the distal end 807 of the first angled vertical telescoping member 805 and the second angled vertical telescoping member 806 using shaft collars, pins, or any other similar mechanism known in the art on each side of the reel 100. The device 800, if it has wheels 804, can then be pushed and used to transport the reel 100 within a facility or beyond. Once in position, the reel 100 can be wound or unwound with ease while mounted upon the device 800.

In another embodiment of the device 800 in use, the A-frame support structures 801 may be positioned on either side of a reel 100 that is in contact with the floor or ground. The piston 813 can then be used to draw the opposite ends of the center retractable member 803 closer together, thereby raising the height of the reel bore bar 802 and the reel 100 itself. In this embodiment, the reel 100 can be lifted from the floor and then moved, maneuvered, wound or unwound.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the versions contained therein.

What is claimed is:

1. An apparatus for lifting, maneuvering, winding or unwinding reels, wherein the reel comprises a centrally-disposed barrel having two opposite ends and a center bore therethrough, said apparatus comprising a pair of devices, wherein each device comprises:

a) a center retractable member having a first end and a second end which are adjustable relative to one another;
b) a first angularly-oriented vertical support bar having a proximal end and a distal end, wherein the first angularly-oriented vertical support bar is pivotally mounted on a first end of the center retractable member;
c) a second angularly-oriented vertical support bar having a proximal end and a distal end, wherein the angularly-oriented vertical support bar is pivotally mounted on a second end of the center retractable member and wherein the first angularly-oriented vertical support bar and the second angularly-oriented vertical support bar are pivotally joined to each other at their distal ends;
d) a means for adjusting the first and second ends of the center retractable member relative to one another so that the first and second ends of the center retractable member are moved closer together and further apart; and
e) a reel bore bar adapted to be inserted through the center bore of the reel and removably affixed to the pivotal joint of the first angularly-oriented vertical support bar and the second angularly-oriented vertical support bar on each device, wherein adjustment of the first and second ends of the center retractable member toward each other moves the removably affixed reel bore bar upward.

2. The apparatus of claim 1, further comprising at least one wheel mounted on the underside of each side of the center retractable member.

3. The apparatus of claim 1, wherein the center retractable member comprises a male member and a female member in a telescoping configuration.

4. The apparatus of claim 1, wherein the first angularly-oriented vertical support bar comprises a male member and a female member in a telescoping configuration.

5. The apparatus of claim 1, wherein the second angularly-oriented vertical support bar comprises a male member and a female member in a telescoping configuration.

6. The apparatus of claim 1, wherein the angle between the first angularly-oriented vertical support bar and the second angularly-oriented vertical support bar decreases as the adjusting means draws the two opposite ends of the center retractable member closer together.

7. The apparatus of claim 1, wherein the adjusting means comprises an actuating piston.

8. The apparatus of claim 7, wherein the actuating piston is mounted on the outside of the center retractable member.

9. The apparatus of claim 7, wherein the actuating piston is mounted within the center retractable member.

* * * * *